(12) United States Patent
Cheng

(10) Patent No.: US 8,416,567 B2
(45) Date of Patent: Apr. 9, 2013

(54) TOWER COMPUTER SYSTEM

(76) Inventor: Liang-Ho Cheng, Taoyuan County (TW)

(*) Notice: Subject to any disclaimer, the term of this patent is extended or adjusted under 35 U.S.C. 154(b) by 324 days.

(21) Appl. No.: 13/005,154

(22) Filed: Jan. 12, 2011

(65) Prior Publication Data

US 2012/0020016 A1    Jan. 26, 2012

(30) Foreign Application Priority Data

Jul. 20, 2010  (CN) .......................... 2010 1 0238037

(51) Int. Cl.
*H05K 7/20*  (2006.01)

(52) U.S. Cl.
USPC ................. 361/679.48; 361/679.02; 361/690; 361/695

(58) Field of Classification Search .................. None
See application file for complete search history.

(56) References Cited

U.S. PATENT DOCUMENTS

| | | | | |
|---|---|---|---|---|
| 5,515,515 A | * | 5/1996 | Kennedy et al. ............. | 710/302 |
| 6,222,725 B1 | * | 4/2001 | Jo ............................. | 361/679.23 |
| 6,769,551 B2 | * | 8/2004 | Rafferty et al. ............. | 211/26 |
| 7,326,879 B2 | * | 2/2008 | Andersen et al. ........... | 219/130.1 |
| 7,929,301 B2 | * | 4/2011 | Fong et al. .................. | 361/695 |
| 8,045,328 B1 | * | 10/2011 | Chen .......................... | 361/695 |
| 2003/0184961 A1 | * | 10/2003 | Ahn ............................ | 361/683 |

* cited by examiner

*Primary Examiner* — Boris Chervinsky
(74) *Attorney, Agent, or Firm* — Rosenberg, Klein & Lee

(57) ABSTRACT

A tower computer system includes a tower chassis; a mounting assembly installed at a middle section of a widthwise surface of the tower chassis and coupled to internal sides of the front and rear racks to form a vertical connecting board for providing a longitudinally perpendicular fixing position to a predetermined board, and acting as a longitudinal corresponding line formed by connecting the front rack to the rear rack for the connecting board of the mounting assembly, such that the transverse widthwise surface of the tower chassis is separated into a first assembling chamber with an opening aligned towards the left side and a second assembling chamber with an opening aligned towards the right side; and a first electric connection port, disposed in a vertical direction on the rear rack and at a position proximate to the mounting assembly, and situated in an area inside the first assembling chamber.

15 Claims, 29 Drawing Sheets

TOWER COMPUTER SYSTEM

BACKGROUND OF THE INVENTION (a) Field of the Invention

The present invention relates to a tower computer system, and more particularly to a tower computer system having a chassis provided for installing a motherboard vertically at a middle section of a widthwise surface of the chassis to form separate chambers and separate wind fields.

(b) Description of the Related Art

The effect of Moore's Law shows that the performance of products manufactured by chip manufacturing technologies is directly proportional to the power consumption and inversely proportional to the rise of temperature. As a result, products of the same stage have a power consumption equivalent to the performance capability. Main systems of computers, servers or game players composed of chip products generally come with a design of a heat sink. In addition to the requirement of blowing air from the front at a heat source (the inventor of the present invention has filed several patent applications for the structure of heat sinks that collect air and blow air from the front), an air inlet of the fan is designed at a position closest to the edge of the case to constitute the priority of the heat dissipation of the system.

Secondly, the efficiency of the fan for dissipating heat of the case is determined by indoor ventilation and air exchange, and air is a fluid dispersed and filled into a space, and thus the method of installing the fans one by one on each heat sink for sucking air directly from the outside of the case is set for the following simple calculation, that is, the air supply quantity of each fan per unit time (q/t) is summed and then the sum is divided by the volume (Q) of the box to obtain the number of times (N) of air exchange. In other words, $[(q1/t+q2/t+ \ldots )/Q]=N/t$, which can be used for calculating a larger number of times which indicates the quantity of air flowing in the case within the time unit for a higher frequency of heat dissipations and exchanges to dissipating the heat from the box. If the assembly can avoid the range of wind blown by each fan causing the reduction of the wind force, then a relatively faster flow speed can be achieved by a small pressure difference even though there is not enough total area of the ventilation holes of the box. As a result, the total quantity of wind can be discharged successfully without requiring an additional exhaustion fan or reducing the overall efficiency of the heat dissipation operation.

With reference to FIGS. 1A and 1B for a desktop computer in a tower square framed case structure which is the most representative type of structure now, and the conventional structure of a main system generally installs all components into a case 11 from a single lateral side, such that a motherboard 12 with a chip heat sink and a display expansion component 13 are installed on a internal lateral layer of the case 11, such that a fan 15 on a heat sink 14 has no chance to have a heat exchange with the external cooler air, and the fan can only whirl the interior of the case 11. Even if there is a change to the structure of the case and the installation of components, the fan of the power supply device 16 and an additionally installed fan 17 are used for blowing air indirectly to dissipate the heat gradually, and the sequence of the heat dissipation of the system is reverse and thus resulting in a poor heat dissipation effect. Furthermore, the internal lateral layer of the case is aligned outward, and components such as a hard disk, an optical disk drive and a support frame for installing the aforementioned components constitute many obstacles and dead corners for the ventilation. Therefore, the temperature continuously circulates inside the case and gets higher and higher. Even with the installation of additional fans, and the use of good chip heat sinks, the heat dissipation effect cannot be improved.

As shown in FIG. 2, Intel, a major chip manufacturing focuses on the overall system heat dissipation to provide a solution, and the measure taken is to rearrange the component modules on the motherboard, and then proposes a BTX specification, wherein the left and right sides of the assembly of the case 11 are switched, and a heat sink with a wind guide cover for blowing air sideway is invented and applied. More specifically, the fan 15 on the heat sink 14 is moved to a position close to a front end of a front panel of the case, and the wind guide cover is used for guiding external cooler air sucked by the fan into the case in a sideway direction, while blowing the external air at the heat sink 14 and the backside of the motherboard to achieve an expected performance by forming a linear airflow in the case 11.

However, this technical measure has taken the heat dissipation of the system into consideration, that is, it is necessary to suck external cooler air directly from outside of the case by the fan installed on the chip heat sink and blow the air at the backside of the motherboard, but all component modules are still required to be installed into the case 11 from a lateral side as specified in the ATX specification. This specification switches the original left and right directions for installing the system without many changes in other aspects. Therefore, the fan installed on the power supply device 16 and additional fans 17 are still used for the system heat dissipation. In such indirect transmission, the heat is dissipated gradually. In general, two fans can be connected for the use of a same wind field, and the maximum air exchange quantity is only slightly greater than one of the fan with the largest wind capacity. In other words, despite many fans installed, most of the quantity of the wind are offset with each other and cannot be accumulated. Furthermore, internal components and support frames for installing these components constitute many dead corners to produce a reverse pressure, and such reverse pressure will block the airflow from being spread out, exchanged and delivered. As a result, a linear airflow cannot be achieved, and the amount of airflow corresponding to the number of fans cannot be made. Furthermore, the airflow blowing from lateral sides and used for exchange heat with a heat sink has less effect than the airflow blowing from the front side. These drawbacks give rise to the short life cycle of products of the related specification and exclusively specified component modules such as the heat sinks and cases, and these products are not available in the retailed market anymore since 2006. Nevertheless, the detailed factors and statements of the BTX specification is still listed and provided for comparison and reference on Information part of Intel website. Thus, no more descriptions are given here.

With reference to FIG. 3 for a patented technology disclosed by Taiwan Pat. No. M255449, a wind guide cover 18 is used for guiding external cooler air sucked by a fan into the case 11, and the cool air blows from the front side of the fan at a heat sink. Although the motherboard is still situated on the internal lateral layer of the case to improve the heat dissipation effect of a chip, yet dead corners stopping airflow still exist in the case and the assembling process is inconvenient. All these drawbacks have not been overcome. With reference to FIG. 4 for a patented technology disclosed by M343188, the volume of the case is increased for installing more fans 17 along a side of the motherboard, such that a large quantity of air is sent from the outside into the case for an exchange of heat whirled by the fans as if there were no case enclosing the system. However, without changing the position of the motherboard installed at the internal lateral layer of the case, this technology involving a large case and many fans incurs not only a high manufacturing cost but also an excessive occupied space, causing inconvenience to its use, and creating a constriction to users.

With reference to FIG. 5 for a patented technology disclosed by Taiwan Pat. No. M363771, a quick installing and removing device is added, and the position of installing the power supply device 16 is changed to a position under the motherboard to increase the distance between the expansion slot and the bottom of the case, such that the space for installing the expansion card and sucking air is increased to provide a sufficient air sucking distance, and a very large multi-vane turbofan 17a is used for sucking air. Obviously, the result is the same as that of the patented technology disclosed in Taiwan. Pat. No. M343188. Besides the drawback of having a too-large case, the additional installed multi-vane turbofan causes tremendous noise, and a computer user may feel like staying in the environment of a factory.

In the aforementioned methods, fans are added or increased, but the improvement or remediation is not cost-effective.

With reference to FIG. 6 for an embodiment of a Pico-BTX system as disclosed in Taiwan. Pat. No. M261746, although this patented technology can provide a solution to improve the heat dissipation by sucking air from the outside into the case and is without the restriction of a single installation direction, it is a pity that the motherboard 12 having chips and needing heat dissipation most is installed at the bottom of the case, and the structure of the horizontal motherboard 12 usually accumulates dust. The conventional system having the drawbacks of a single wind field and a single chamber assembly has not been improved much, and the indirect heat exchange as specified in the BTX specification is still adopted, and a heat sink with sideway airflow and a lower heat dissipation effect is adopted so that a higher-performance product with larger power consumption is not allowed for collaboration. Moreover, as the component modules are positioned in a way of being stacked one and another, the miniaturized case is restricted by fixed frames necessarily on both sides and hardly retards the operation of assembling the system. Furthermore, the components of the case and the material of the heat sink in accordance with the Pico-BTX specification no longer have the usefulness of exchanging the component modules of the tower system.

With reference to FIG. 7 for a patented technology disclosed in Taiwan Pat. No. M361201, the case 11 is a multilayer structure provided for connecting an expansion card 121 to the bottom of the motherboard 12. Although a flat cable 122 can be used for installing the expansion card 121 more flexibly, it wastes too much space in a small system, and the horizontal motherboard 12 and support frame have the same drawbacks of the aforementioned Taiwan Pat. No. M261746.

There are other related patents such as a support frame that can be turned over and disassembled easily, but same as the aforementioned patents, these patents still have not considered the factors of the sequence of heat dissipating airflow, and the components are installed from the inside to the outside. Even though the chip products with fans are mounted, the outwardly aligned bottom surface of the support frame results in blocking the air inlet and failing to suck cooler air into the case from the outside.

With reference to FIG. 8 for a patented technology as disclosed in Taiwan Pat. No. 1274980, the overall structure comprises of a pair of circular or polygonal support modules 19 suspended in the air and connected with each other into a board support frame 191 used for the assembly, and form two non-vertical separated containing spaces. As disclosed in this patent, "the computer system structure" aims to break through the conventional design of a square framed tower case structure, and provide a function similar to a portable stereo. Moreover, it states that the previous computer is used as a computer only without add-on functions and thus such computer system has low economic benefit and fails to comply with the cost-effective requirements of modern people. In the meantime, damages caused by the loss or missing of private and confidential data stored in the computer system must be reduced, and thus the add-on function and expandability of the existing product are sacrificed. The horizontal computer system is used for carrying a single Pico-BTX motherboard specification, not only losing the diversified using value of the expandability of the computer product, but also inheriting the poor convection effect of the air in the conventional computer system.

In summation of the description above, regardless of installing all component modules from a single lateral side into the chassis, the prior art installs the motherboard that most requires the heat dissipation at a internal lateral layer of the case. As a result, the issues of ventilation, heat dissipation, installation of expanded devices and spatial volume cannot be taken care at the same time, regardless of the change, thought or innovation for the internal structure.

As chip manufacturing technology advances, many low-power components including the communication, network, video and display expansion cards are integrated onto the motherboard to produce a simplified computer, and thus the performance of these expansion cards has the performance similar to a thin client computer only, and such products disappear from the market in no time. Particularly, products like display and graphic cards consume power not less than a computing processor on the motherboard, so that they are not replaced by the thin client computer. Therefore, products such as display and graphic cards require a heat sink similar to that for the computing processor. However, the expansion slots of the motherboard still adopts an interval of 2 cm apart from each other, and the present existing expansion cards generally have pins aligned in a direction towards the air sucking inlet of the fan, and the motherboard 13 as shown in FIG. 1A is installed at the internal lateral layer of the case, such that if the expansion cards are inserted one by one, there will be a problem of installing a thin fan. A normal heat dissipation operation cannot be performed, and thus the conditions of using an expanded component module which is very different from the thin client computer cannot be used. Obviously, the prior art requires further improvements.

SUMMARY OF THE INVENTION

The primary object of the present invention is to provide a tower computer system having a mounting assembly of a tower chassis for facilitating users to install a motherboard vertically and divide the chassis into two back-to-back assembling chambers, so as to reduce the length of the chassis to appropriate length and height, increasing the load carrying capacity of the chassis, and improve the convenience of the installation and expansion upgrade, and using separated wind fields to improve the heat dissipation efficiency.

Another object of the present invention is to provide a tower computer system having a support module installed vertically adjacent to a motherboard to facilitate installing expanded electronic components.

In order to achieve the above-mentioned objects, the invention includes:

a tower chassis, being a U-shape body composed of a bottom, a front rack and a rear rack;

a mounting assembly, installed at a middle section of a widthwise surface (W) of the tower chassis, and coupled to internal sides of the front rack and rear rack to form a vertical (Z-Z) connecting board, for providing a longitudinally perpendicular (X-Z) fixing position to a predetermined board, and acting as a longitudinal corresponding line (X1) formed by connecting the front rack to the rear rack for the connecting board of the mounting assembly, such that the transverse (Y-Y) widthwise surface (W) of the tower chassis is separated into a first assembling chamber with an opening aligned towards the left side and a second assembling chamber with an opening aligned towards the right side; and a first electric connection port, disposed in a vertical direction (Z-Z) on the rear rack and at a position proximate to the mounting assembly, and situated in an area inside the first assembling chamber.

According to the invention, the mounting assembly comprises a single connecting board fixed onto internal sides of the front and rear racks of the tower chassis directly. Moreover, the mounting assembly comprises a front connecting plate and a rear connecting plate protruding from internal sides of the front and rear racks of the tower chassis respectively. Meanwhile, a connecting board is coupled between the front and rear connecting plates.

In addition, the bottom and rear rack of the tower chassis include plurality of ventilation holes formed at a middle section.

Besides, the vertical connecting board of the mounting assembly includes a fixing position for fixing a motherboard which is a component with the largest area in the system. Meanwhile, the motherboard includes a connecting port erected on the rear end of the front side and opposite to the first electric connection port, such that the motherboard is installed in a longitudinally perpendicular (X-Z) direction in the first assembling chamber. Moreover, the motherboard includes a first heat sink with a fan installed at the front side of the motherboard.

Furthermore, the rear rack of the tower chassis includes a second electric connection port installed in a vertical direction (Z-Z) of the rear rack and at a position proximate to the mounting assembly, disposed in an area inside the second assembling chamber, and arranged in the vertical direction (Z-Z) parallel and adjacent to the first electric connection port.

Further features of the preferred embodiment of the invention are detailed in claims 7 through 15.

DETAILED DESCRIPTION OF THE PREFERRED EMBODIMENT

Figure 9A:
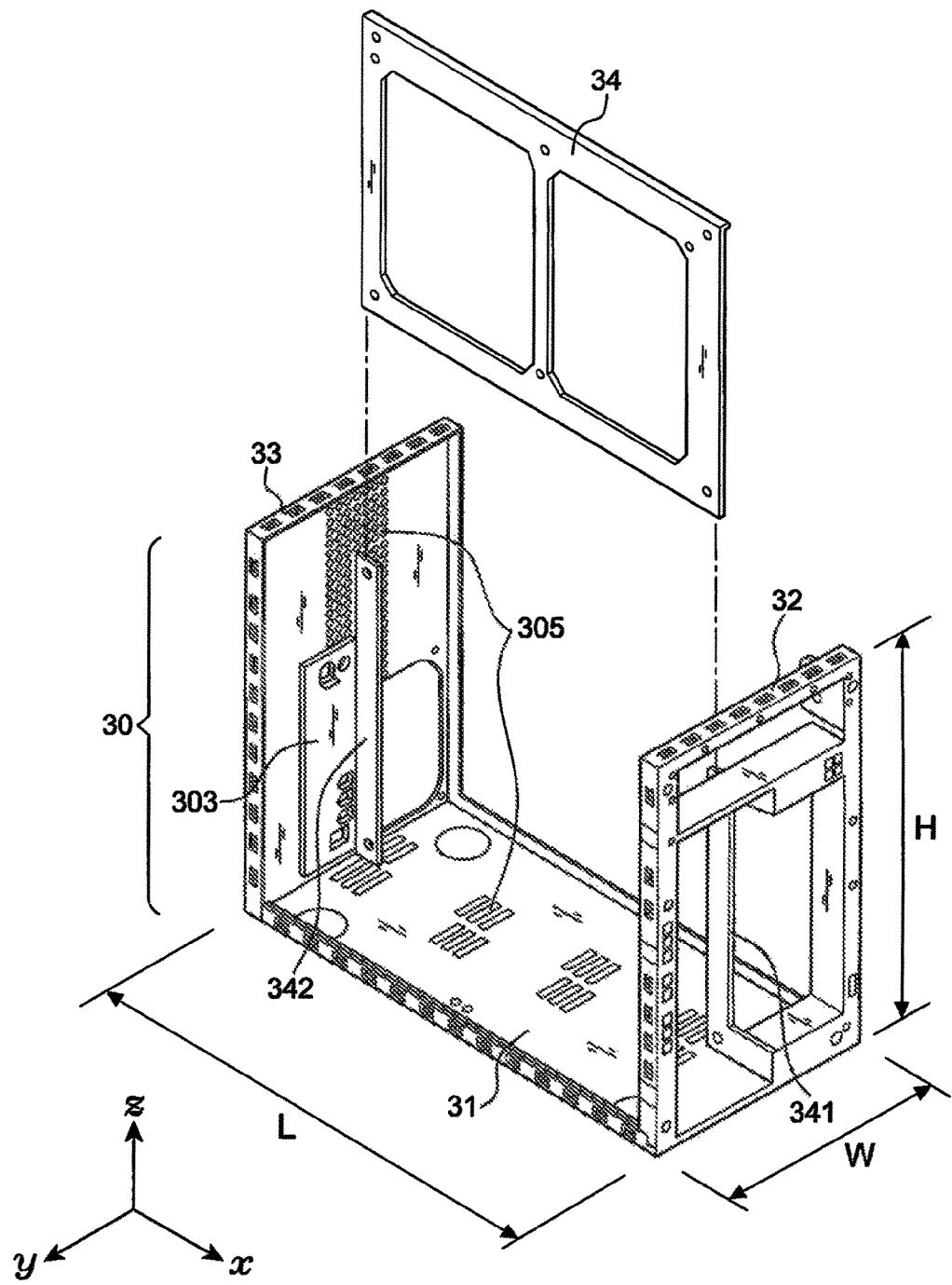
FIGS. 9A, 9B and 9C are an exploded view, a perspective view and a top view of a preferred embodiment of the present invention respectively.
Figure 9B:
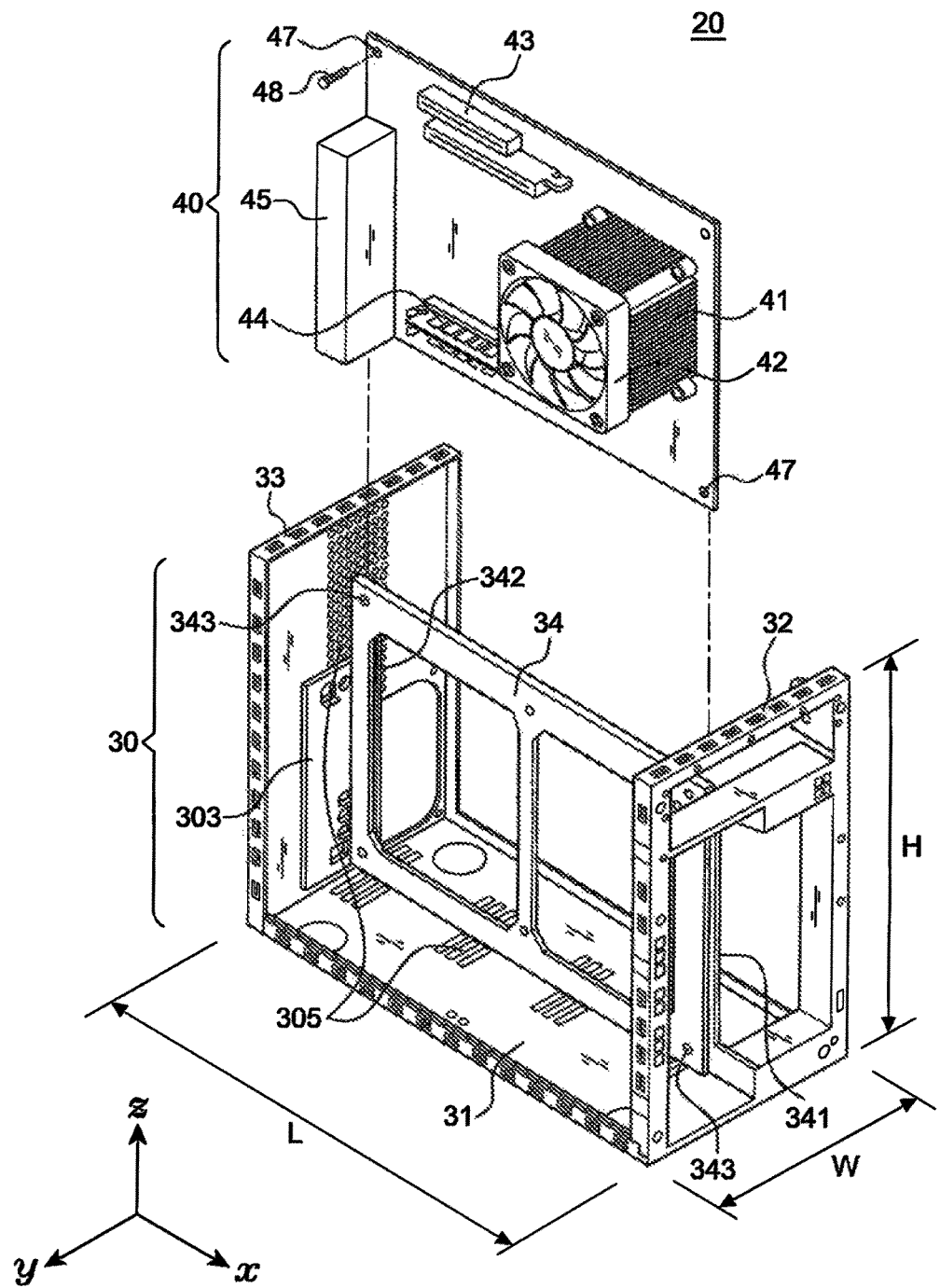
Figure 9C:
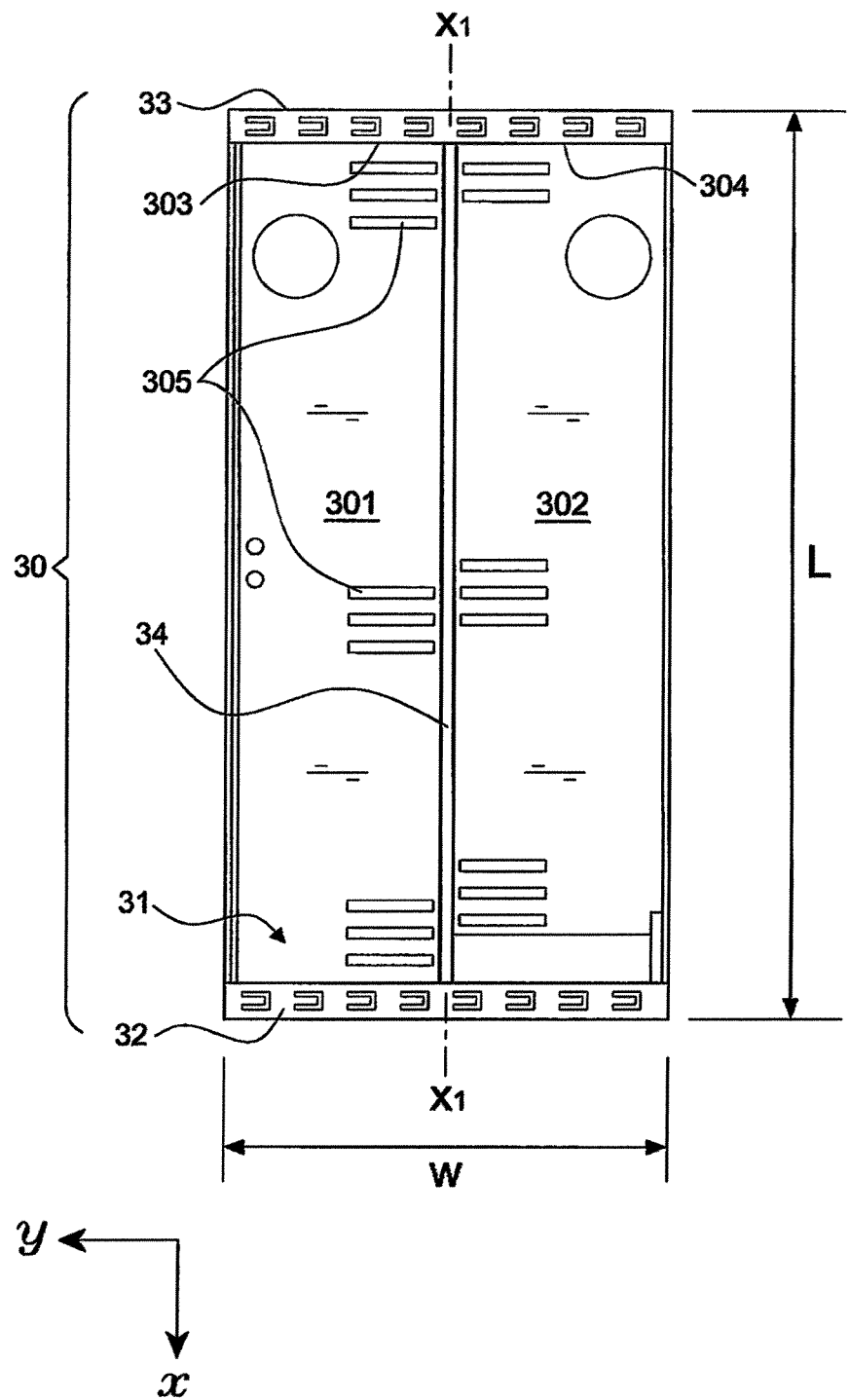

With reference to FIGS. 9A, 9B and 9C for a tower computer system 20 of the present invention, the tower computer system 20 comprises the following elements:

A tower chassis 30 is a U-shaped body composed of a bottom 31, a front rack 32, and a rear rack 33, and integrally formed or connected with each aforementioned component depending on needs, wherein the difference of the tower chassis 30 and a conventional tower chassis resides on that no frame is in the way on both left and right sides of the chassis to provide an opening form for installation, and the total height H of the tower chassis 30 is greater than the width W of the front side of the tower chassis 30 without exceeding 2.1 times of the width W, that is, 2.1 W≧H>W, and the length L does not exceed 2.5 times of the width W, so as to maintain the best position of the center of gravity of the tower case.

A mounting assembly 34 is installed at a middle section of the widthwise surface W of the tower chassis 30 and coupled to internal sides of the front rack 32 and rear rack 33, and the mounting assembly 34 includes a front connecting plate 341 and a rear connecting plate 342 protruding from the internal sides of the front and rear racks 32, 33 respectively as shown in FIG. 9A, and a connecting board 34 coupled between the front and rear connecting plates 341, 342, but the invention is not limited to such arrangement only. In FIG. 9B, a single connecting board 34 can be fixed directly onto internal sides of the front and rear racks 32, 33 of the tower chassis 30. The connecting board used as the mounting assembly 34 can be fixed by soldiering, locking or latching, and the connecting board can be formed with hollow holes or other forms, such that a vertical Z-Z connecting board 34 can provide a predetermined longitudinally perpendicular X-Z position for fixing the board, and the connecting board 34 acting as the mounting assembly can be a longitudinal corresponding line X1 connected from the front rack 32 to the rear rack 33 as shown in FIG. 9C, such that the transverse Y-Y widthwise surface W of the tower chassis 30 can be separated into a first assembling chamber 301 with an opening aligned towards the left side and a second assembling chamber 302 with an opening aligned towards the right side.

A first electric connection port 303 is installed at a position of the rear rack 33 in a vertical direction Z-Z and proximate to the mounting assembly 34 and situated in an area inside the first assembling chamber 301. The bottom 31 and rear rack 33 of the tower chassis 30 include a plurality of ventilation holes 305 formed at a middle section and preferably adjacent to connecting positions of the both sides of the mounting assembly 34.

The vertical connecting board used as the mounting assembly 34 as shown in FIG. 9B provides a position for fixing a motherboard 40 which is a component with the largest area in the system, and the rear end of the front of the motherboard 40 includes a vertical connecting port 45 disposed opposite to the first electric connection port 303, such that the motherboard 40 can be installed in the first assembling chamber 301 in a longitudinally perpendicular direction X-Z. A front side of the motherboard 40 includes a first heat sink 41 equipped with a fan 42, and includes, but not limited thereto a first expanded component module 43 and second expanded component module 44.

The motherboard 40 further including a screw hole 47 or a positioning hole and fixed with a screw 48 or a positioning element into a corresponding locking hole 343 of the mounting assembly 34, such that the motherboard 40 can be installed in a direction perpendicular to the front and rear racks 32, 33, and erected from a middle section on the widthwise surface W of the tower chassis 30, wherein the middle section is not necessary to be the exact middle, but it is substantially the middle with a tolerance of several centimeters depending on needs. Of course, the present invention is not limited to the aforementioned positioning arrangement only.

In the aforementioned assembly of the present invention, a combination of the U-shaped tower chassis 30 and the mounting assembly 34 provides a convenient way for users to install the motherboard 40 perpendicularly and divide the tower chassis 30 into two back-to-back assembling chambers 301, 302 for reducing the length L and the height H of the chassis appropriately, while increasing the load carrying capacity of the case, improving the convenience of the installation and expansion upgrade, and separating wind fields to enhance the heat dissipation efficiency.

Devices and applications with the technical characteristics on the basis of the aforementioned tower chassis 30, mounting assembly 34 and first electric connection port 303 of the present invention are described as follows.

Figure 10:
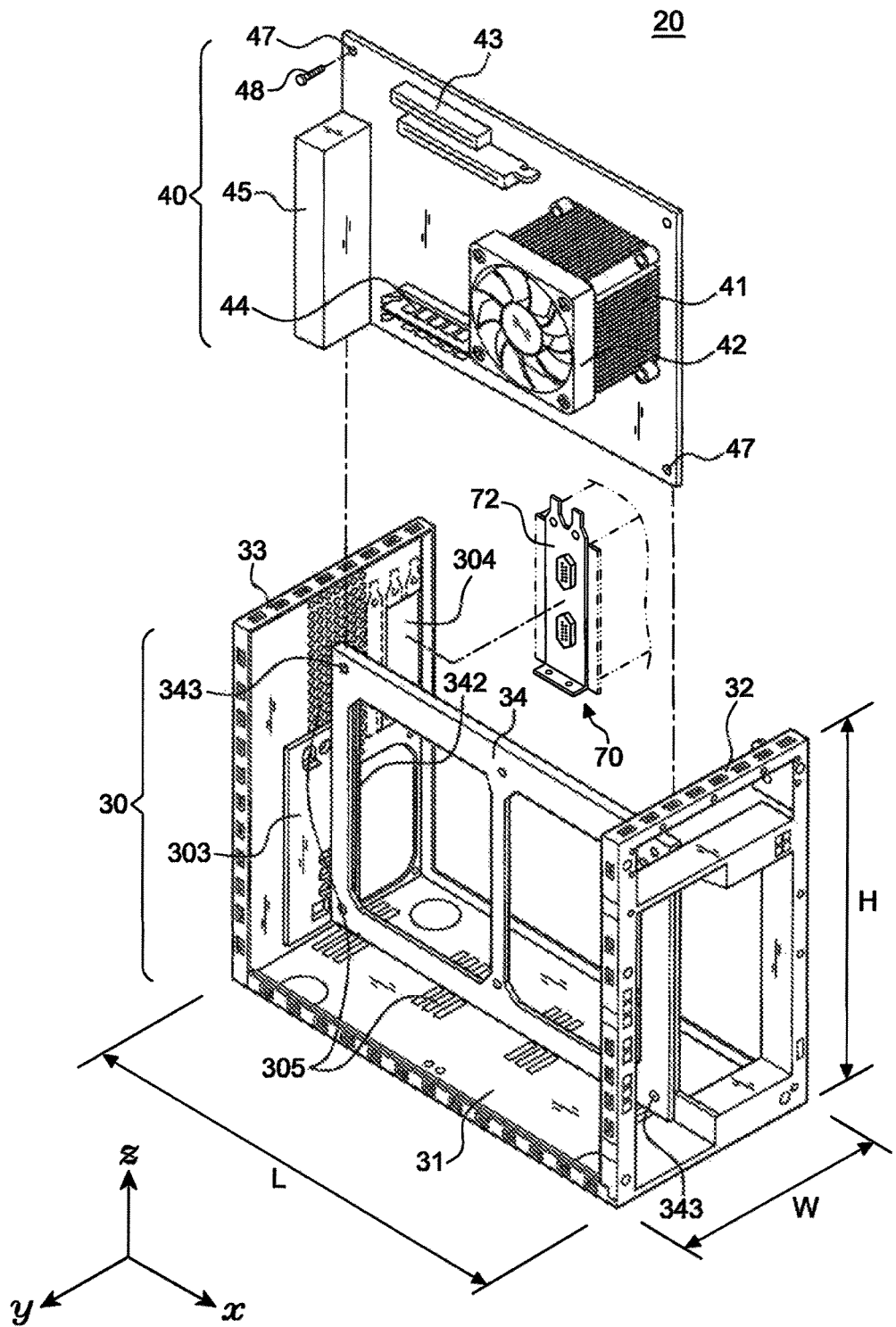
FIG. 10 is an exploded view of another preferred embodiment of the present invention.
Figure 11:
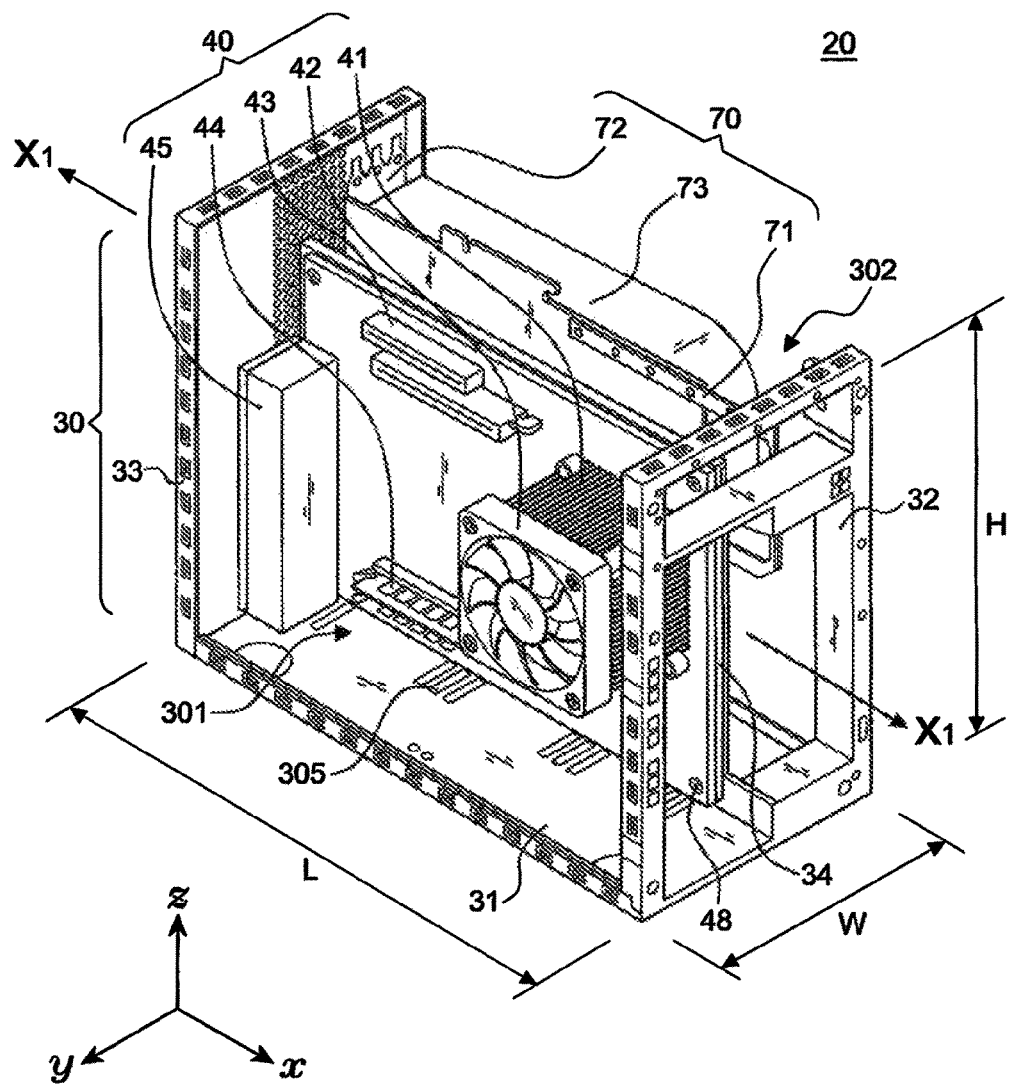
FIG. 11 is a perspective view of another preferred embodiment of the present invention.
Figure 12:
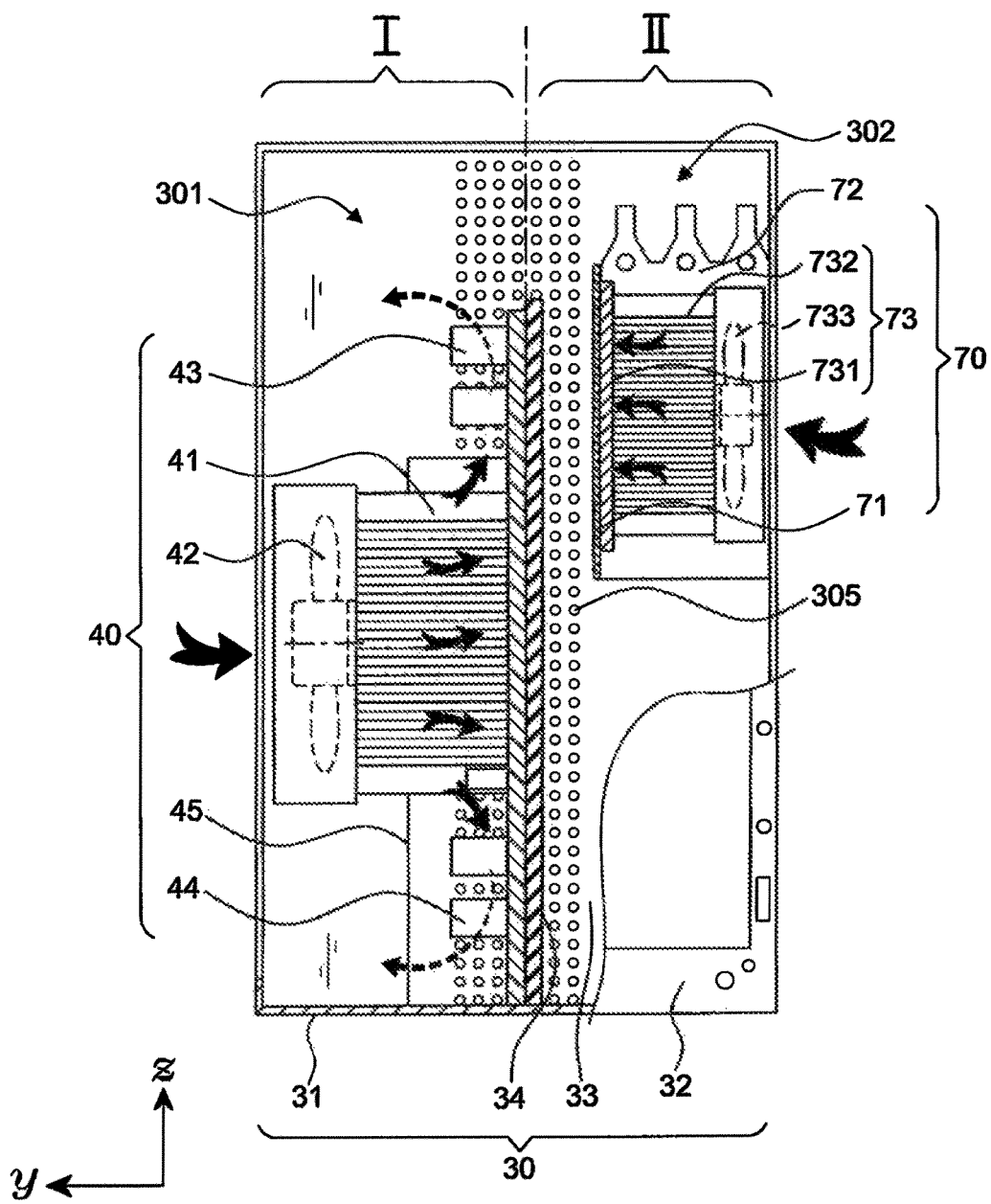
FIG. 12 is a cross-sectional view of another preferred embodiment of the present invention.

In FIGS. 10 to 12, the rear rack 33 of the tower chassis 30 includes a second electric connection port 304 installed in a vertical direction Z-Z at a position of the rear rack 33 proximate to the mounting assembly 34 and situated in an area inside the second assembling chamber 302 and arranged in a vertical direction Z-Z adjacent to the first electric connection port 303.

A support module 70 having an input/output (I/O) electric connecting port 72 is provided for installing a support frame 71 of an expanded electronic component 73 and a rear rack 33, and can be installed at either one or both of the first and second assembling chambers 301, 302. In this preferred embodiment, the support module 70 is installed at an upper right position of the tower chassis 30 and erected in a parallel direction and adjacent to the motherboard 40 for installing the expanded electronic component 73 sequentially in the erected direction as shown in FIG. 12, and the expanded electronic component 73 includes a circuit board 731 installed onto an internal side and a heat sink 732 with a fan 733 is installed onto the circuit board 731. In this preferred embodiment, the fan 42 of the motherboard 40 and the fan 733 of the expanded electronic component 73 are installed in an outward direction and respectively inside the first and second assembling chamber 301, 302, so as to separate the tower chassis 30 into left and right main wind fields I, II, since the fans 42, 733 are respectively near both sides of the tower chassis 30. As a result, external air sucked by the two different fans 42, 733 will blow directly at the heat sinks 42, 732 for the heat dissipation operation separately, and the circuit board 731 of the expanded electronic component 73 is installed in parallel and adjacent to the motherboard 40 for effectively separating the wind fields I, II for separate operation, and the cold air sucked by each fan 42, 733 blows directly at the target and flows towards air holes formed on the casing and the tower chassis 30. The air flows through each component module installed in the first assembling chamber 301 or second assembling chamber 302 and discharges outside automatically or flow to the other assembly chamber, and the heat generated by each component in the chassis is dissipated naturally to achieve the overall heat dissipation effect.

Figure 13A:
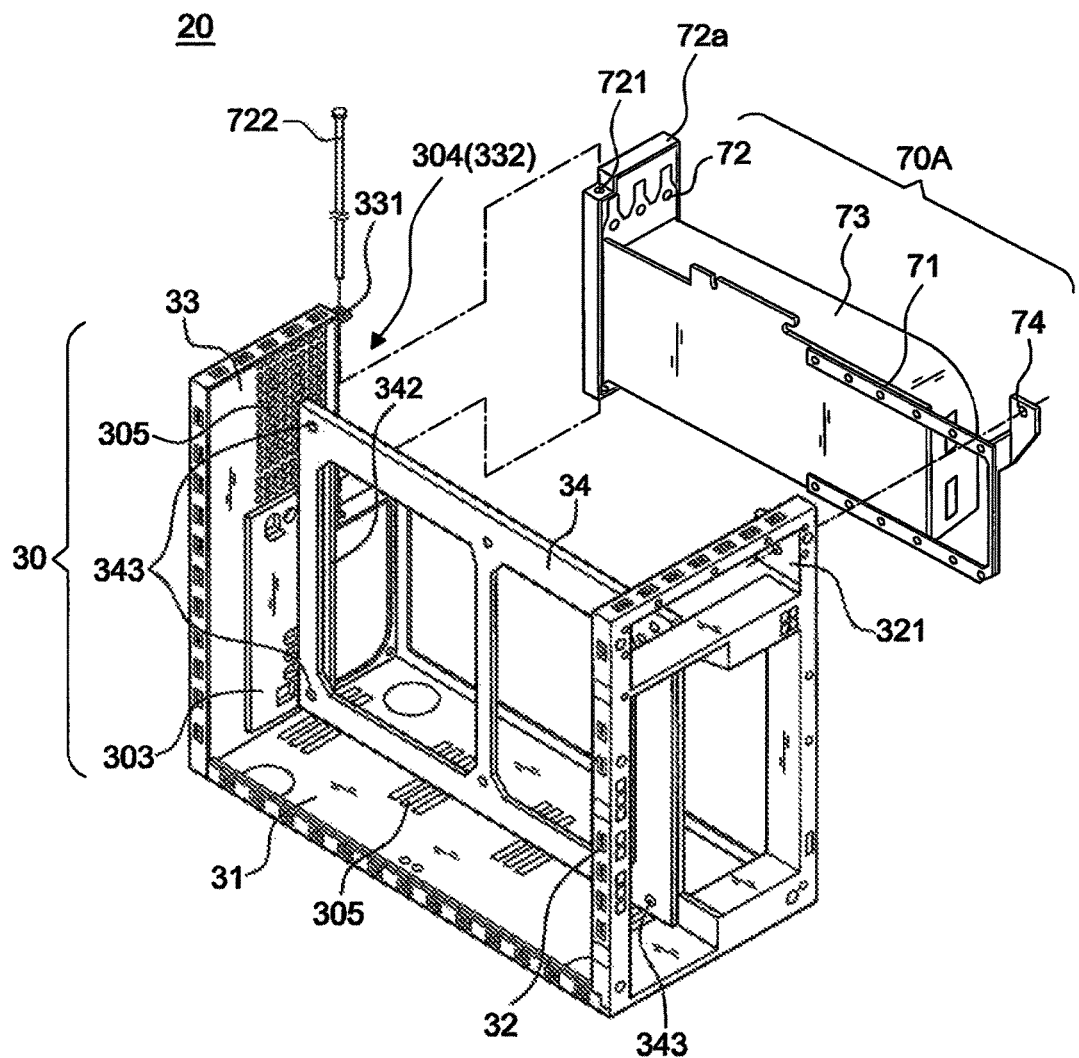
FIGS. 13A~13E show perspective exploded views, perspective view and schematic spread-opened views of the tower chassis substantially in the shape of an L-shaped slot and combined with the support module respectively.
Figure 13B:
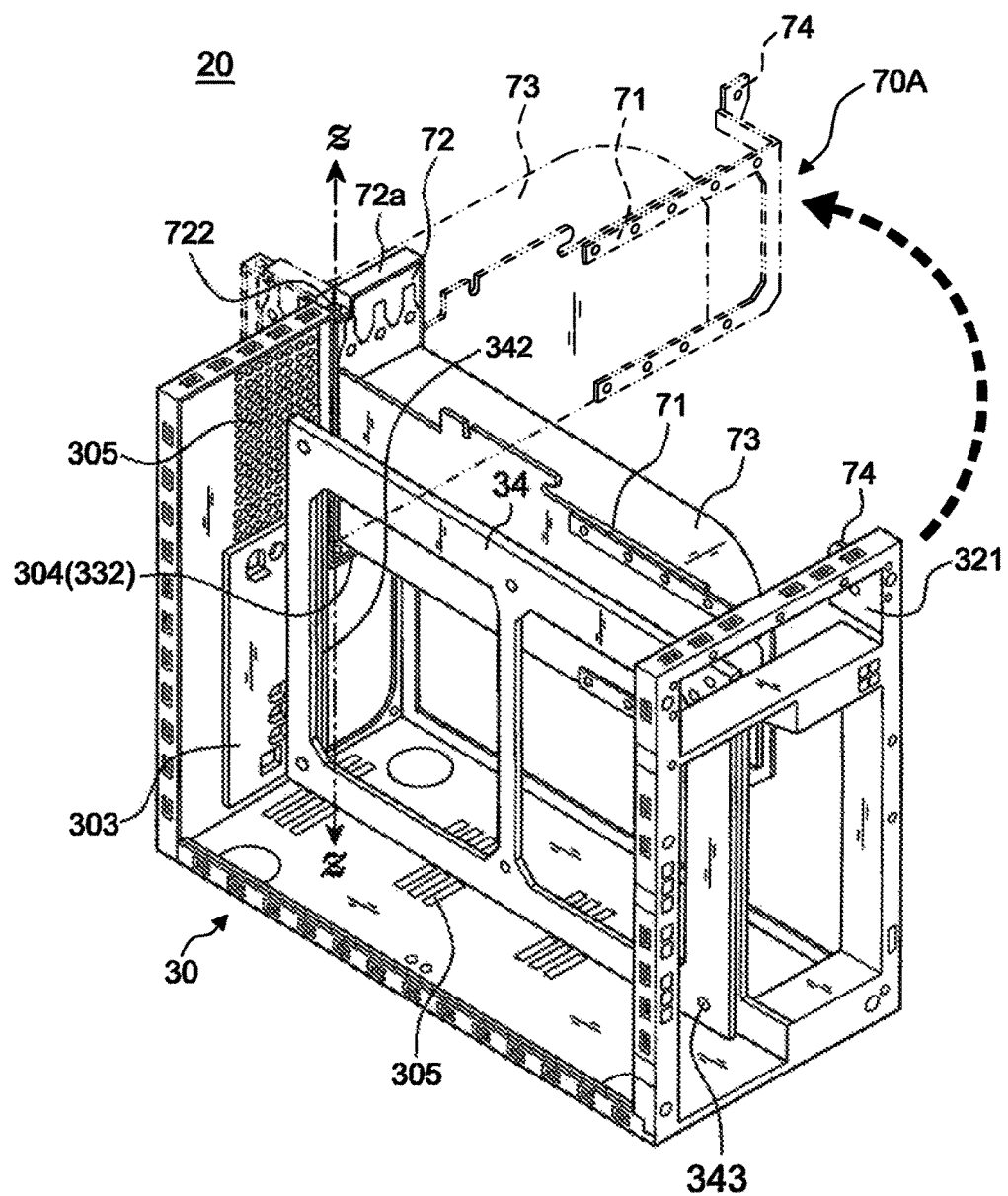
Figure 14A:
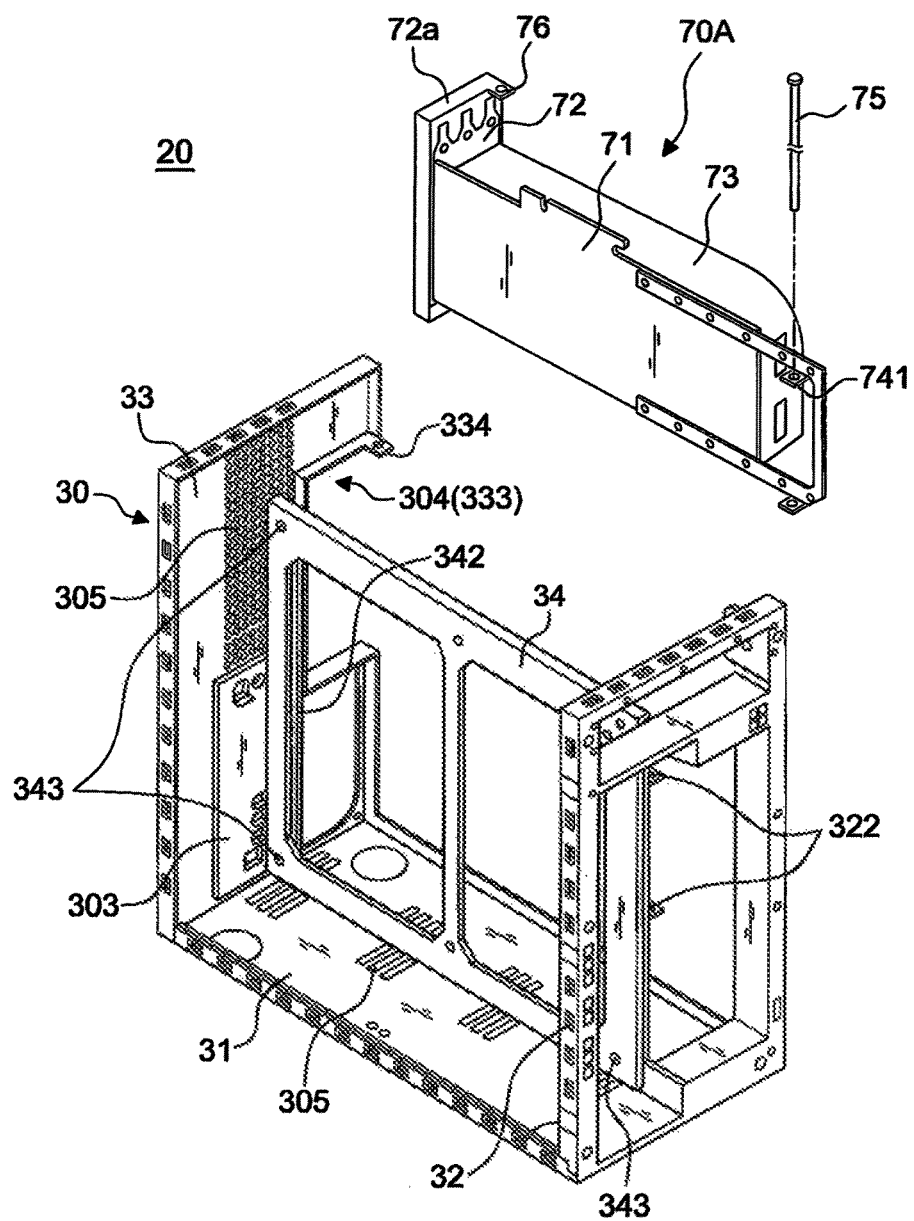
FIGS. 14A~14C show an exploded view and a perspective view of a U-shaped slot combined with a lateral support frame of the tower chassis and a schematic view of lifting the tower chassis open respectively.
Figure 14B:
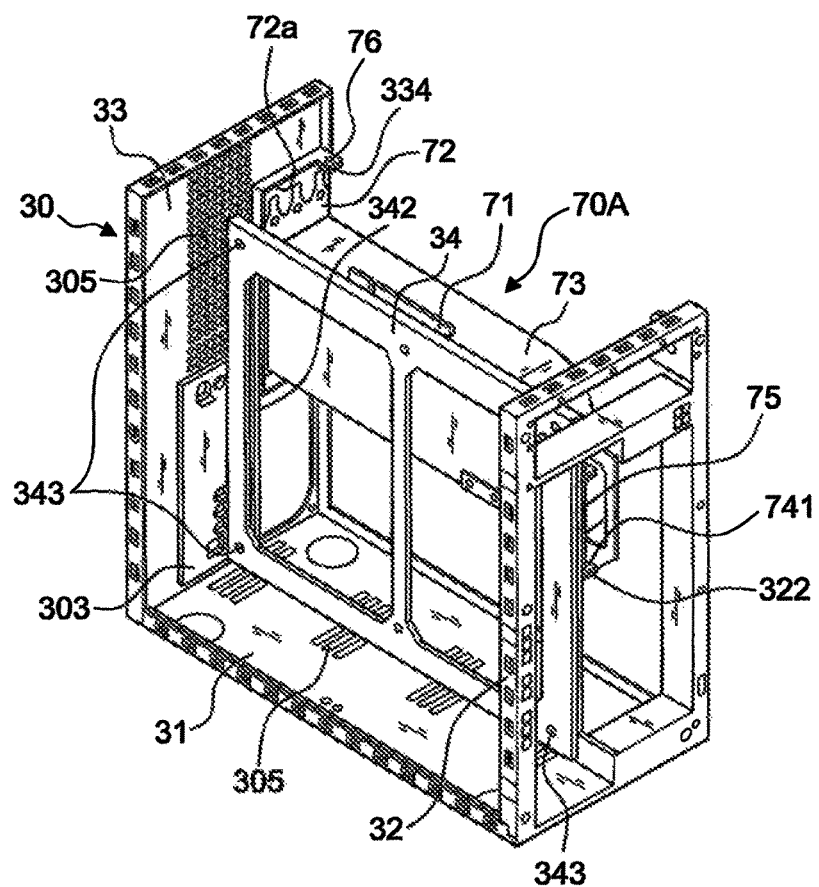
Figure 14C:
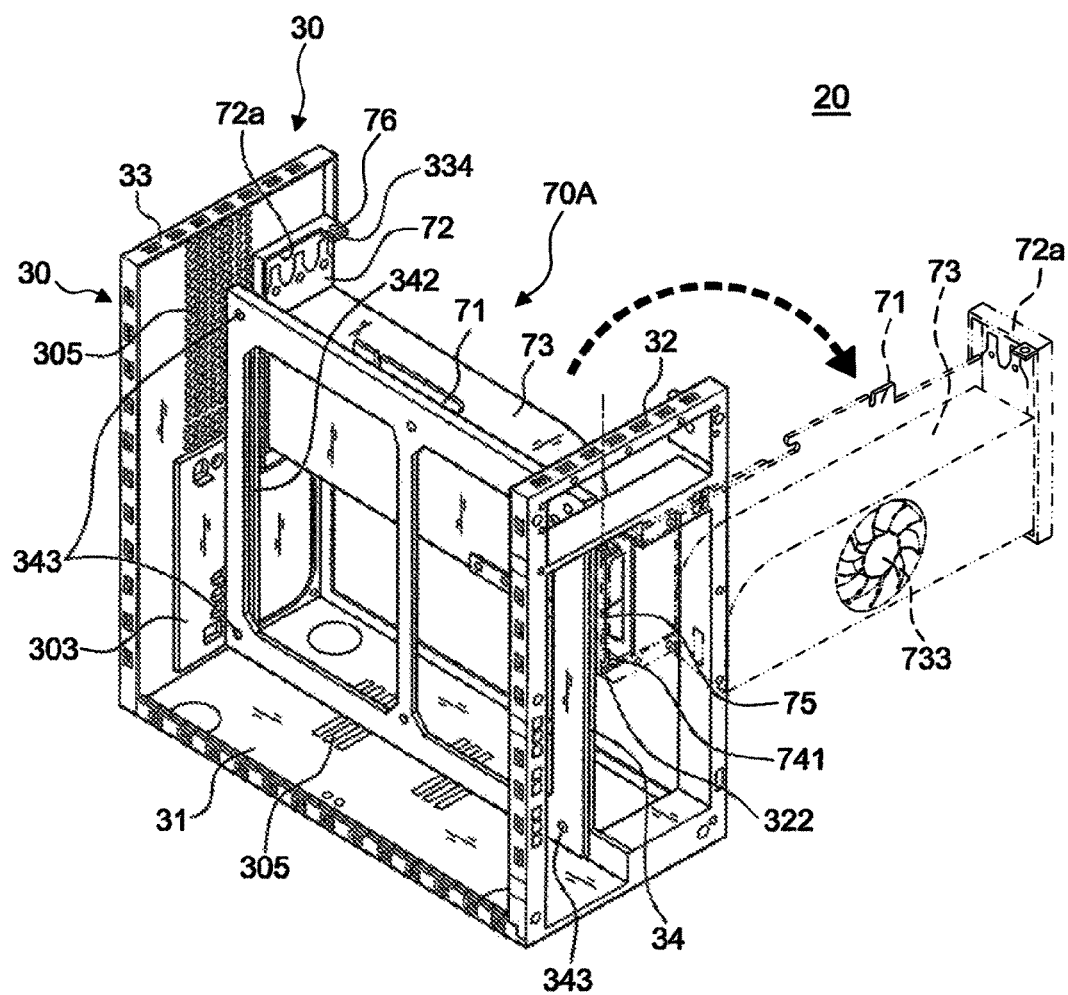

In a feasible embodiment of the present invention, the support module 70 can be a movable support frame module 70A as shown in FIGS. 13A and 13B, and the rear rack 33 includes a second electric connection port 304 formed on the right side of the rear rack 33. In this embodiment, the second electric connection port 304 is an L-shaped slot 332, but not be limited to such only. Alternatively, it can be an n-shaped slot 333 as shown in FIGS. 14A, 14B and 14C, which will be described later.

In FIGS. 13A and 13B, the second electric connection port 304 is an L-shaped slot 332, and the movable support frame module 70A acts as the support module 70 for accommodating an expanded electronic component 73, whose rear side includes an input/output (I/O) electrical connecting portion 72. In this preferred embodiment, it can be an engage/disengage element 72a having a shape corresponsive to the L-shaped slot 332 of the rear rack 33, such that the movable support frame module 70A can be engaged or disengaged with the L-shaped slot 332 or lifted open laterally from the L-shaped slot 332 as shown in FIG. 13B.

In this preferred embodiment, the L-shaped slot 332 of the rear rack of the tower chassis includes a rear pivot base 331, and the movable support frame module 70A includes a rear pivot hole 721 formed at a rear end, and a first pivot 722 is pivotally installed onto the rear pivot base 331, such that the movable support frame module 70A can be engaged from the front to the back by using the rear pivot base 331 as an axis, and it can be engaged by locking the first flange plate 74 at the front side of the movable support frame module 70A to the first positioning plate 321 installed at a position opposite to the front rack 32.

Figure 13C:
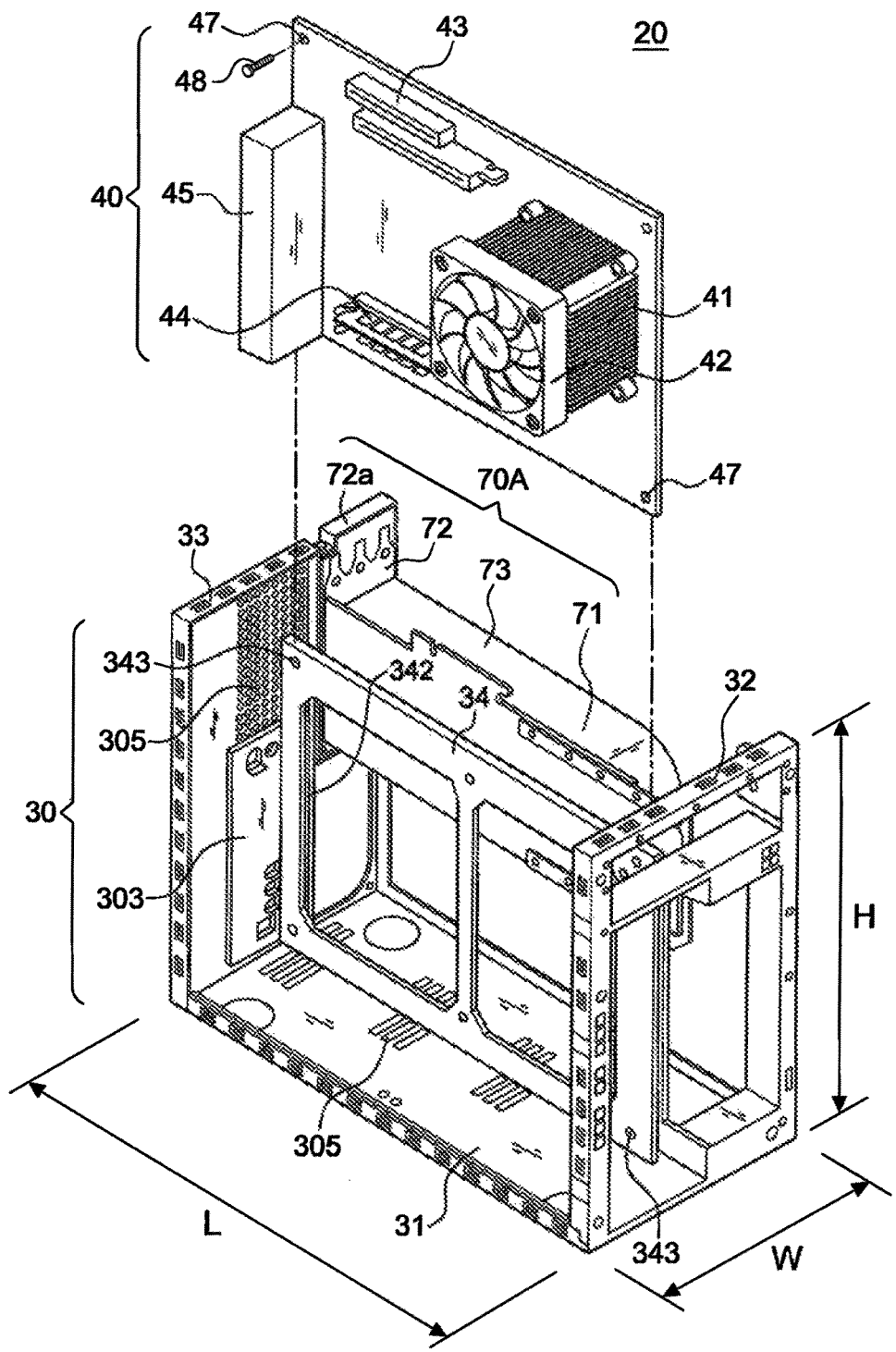
Figure 13D:
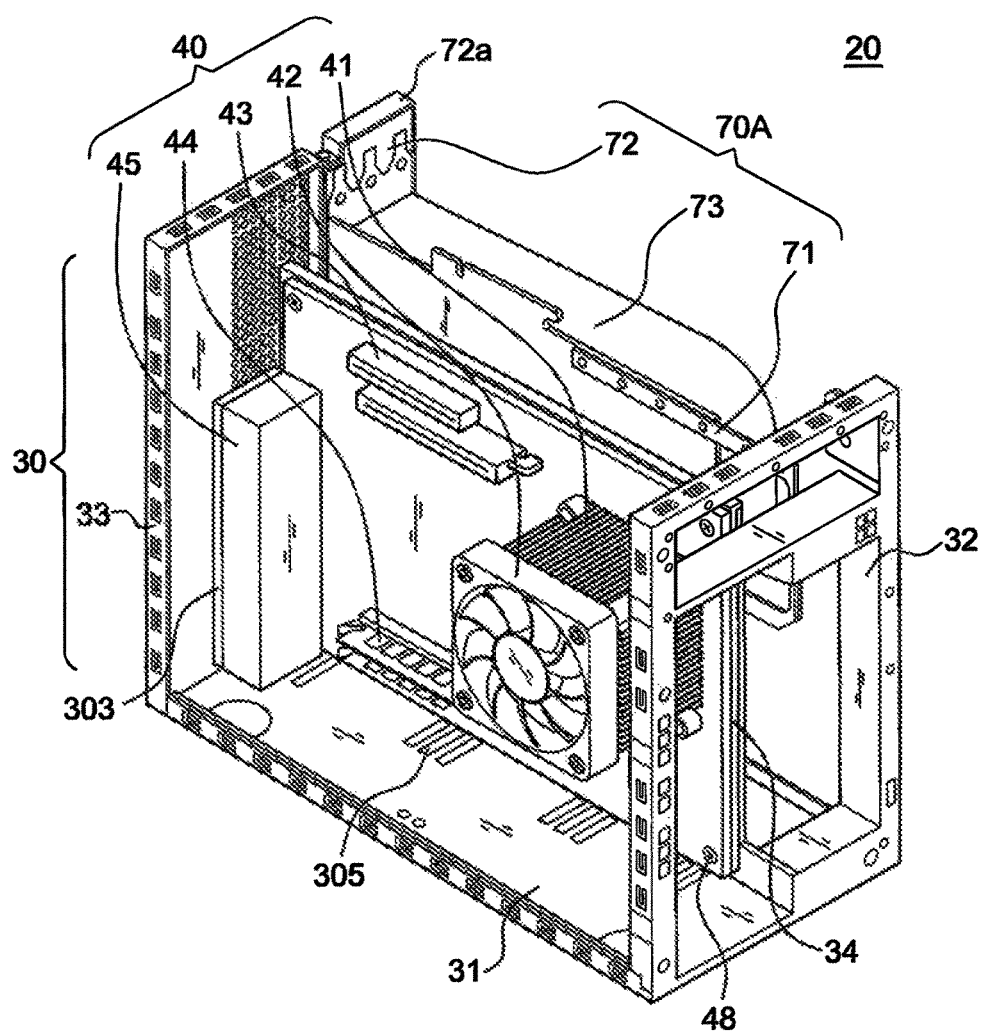

In this preferred embodiment, although the first pivot 722 can pivotally fix the rear side of the movable support frame module 70A to L-shaped slot 332, the present invention is not limited to such arrangement only. That is, the front rack 32 can be used as a pivoting center, and the rear side can be lifted open. FIGS. 13C and 13D show that the motherboard 40 is installed on the mounting assembly 34 and disposed parallel and adjacent to the movable support frame module 70A.

Figure 13E:
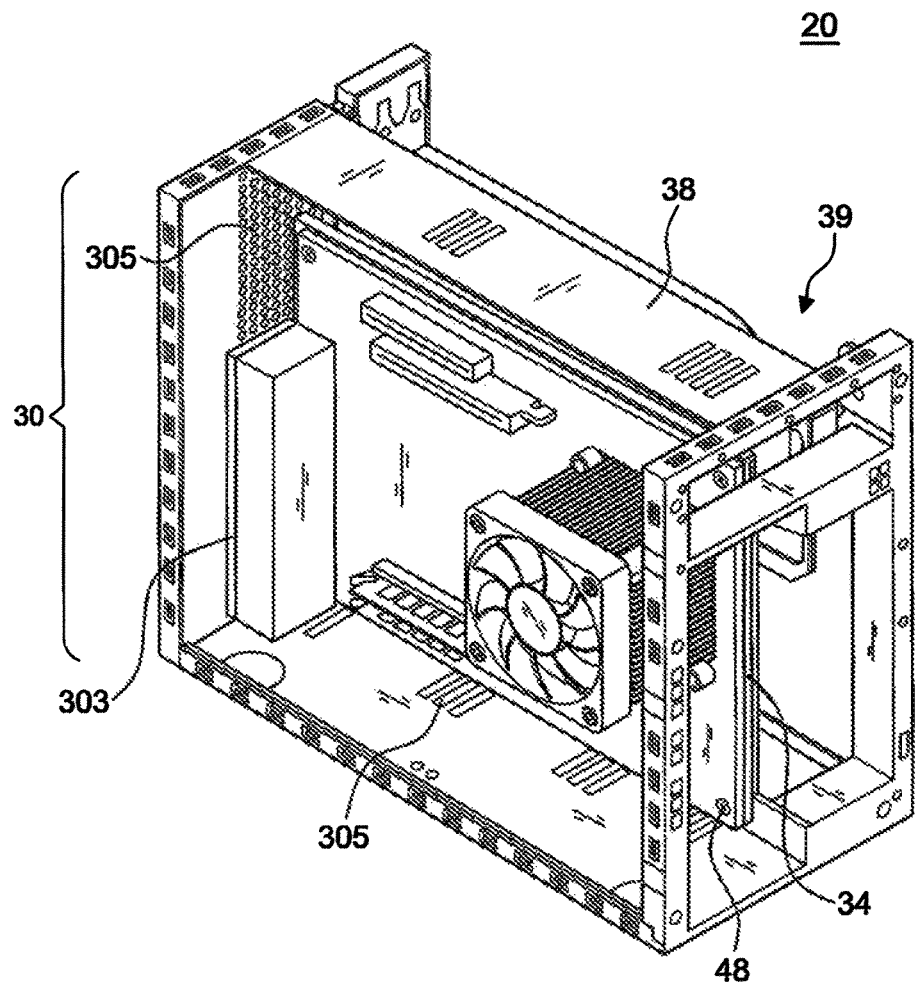

In FIG. 13E, a connecting element 38 is disposed at the top of the U-shaped body of the tower chassis 30 for providing a more secured frame structure 39. However, the connecting element 38 is not a must, and it can be installed when needed.

In FIGS. 14A, 14B and 14C, the second electric connection port 304 of the present invention is an n-shaped slot 333. In this preferred embodiment, the front rack 32 of the tower chassis includes a front pivot base 322, and the movable support frame module 70A includes a front pivot hole 741 formed at a front end and provided for pivotally installing a second pivot 75 onto the front pivot base 322, such that the movable support frame module 70A can be lifted open from the rear to the front by using the front pivot base 322 as an axis. When the movable support frame module 70A is closed, the engage/disengage element 72a, which is the connecting port 72, disposed at a rear side of the movable support frame module 70A can be installed into the slot 333, and the second flange plate 76 of the connecting port 72 is secured to the second positioning plate 334 installed at a position opposite to the rear rack 33.

In this preferred embodiment, although the second pivot 75 can pivotally fix a front end of the movable support frame module 70A to the front rack 32 and the rear side can be closed onto the n-shaped slot 333, the invention should not be limited to such arrangement. The rear end of the movable support frame module 70A can be pivotally installed into the n-shaped slot 333, and the front end can be lifted open, but this is just a changeable way of the present invention, and thus will not be described in details.

Figure 15:
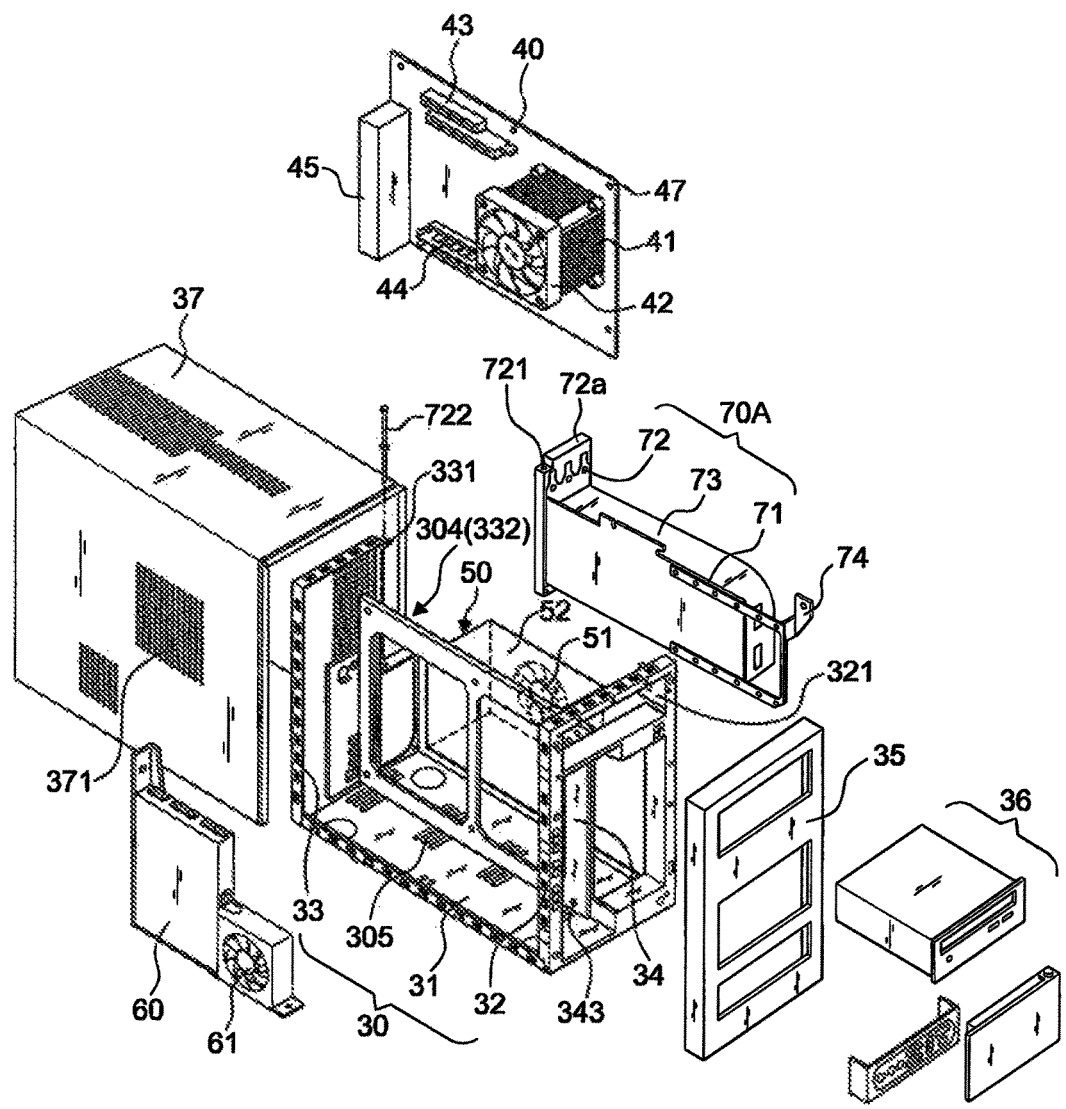
FIG. 15 is an exploded view of a first application of the present invention.
Figure 16:
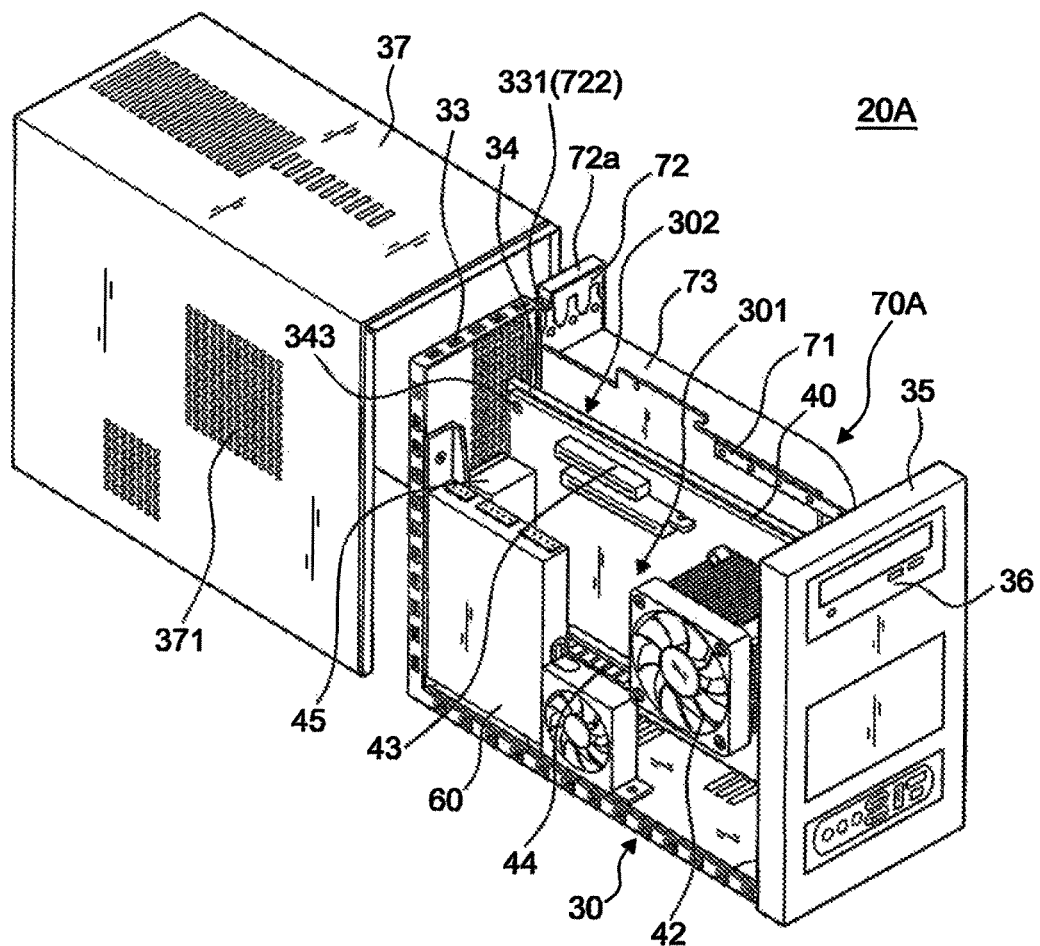
FIG. 16 is an perspetive view of a first application of the present invention.

In FIGS. 15 and 16, the present invention includes, but not be limited thereto a casing 37 on a surface of the tower chassis 30, and a ventilation hole 371 installed at a position opposite to each fan. In this preferred embodiment, the casing 37 is an n-shaped body, but should not be limited thereto. It also can be a plurality of plates secured onto the sides of the tower chassis 30.

Figure 17A:
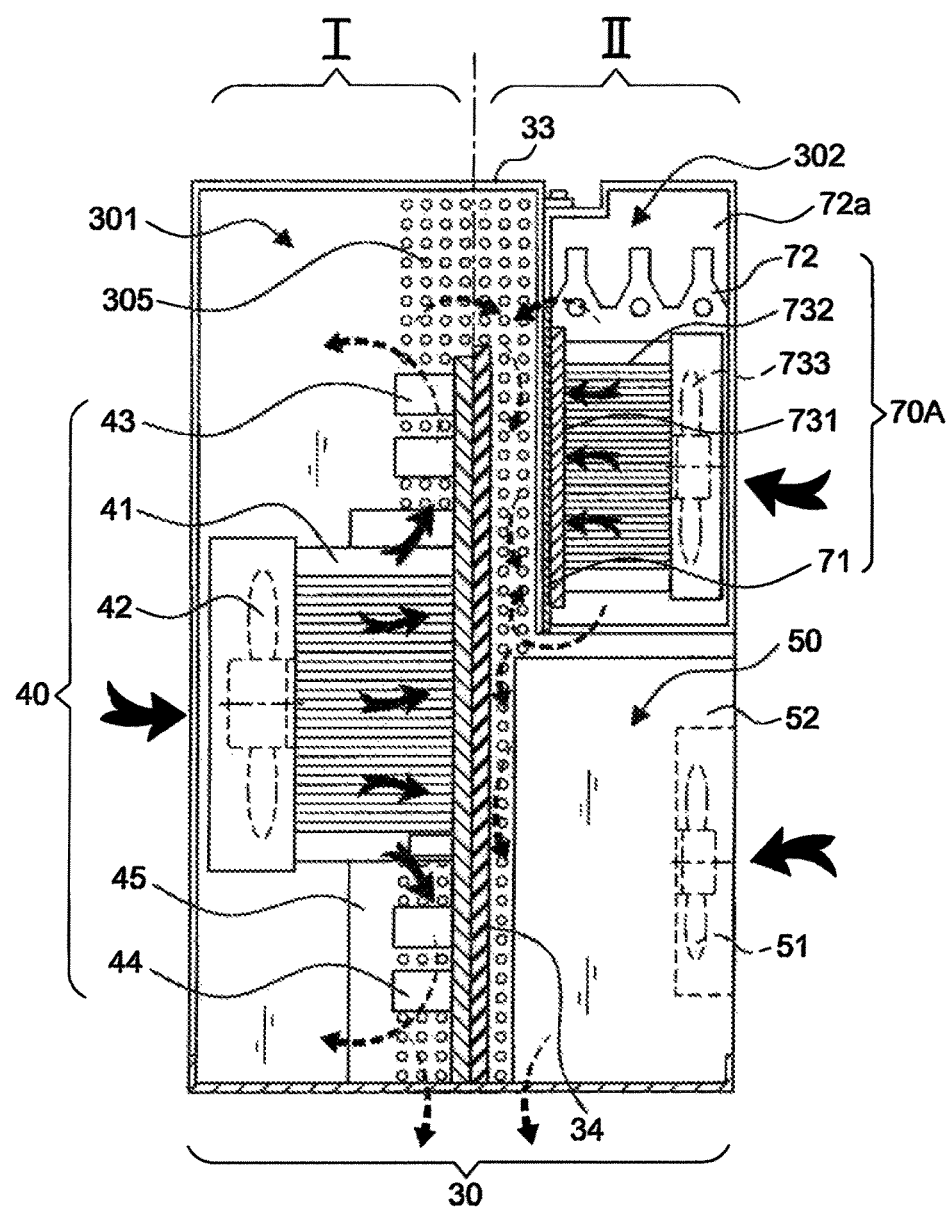
FIG. 17A is a cross-sectional view of FIG. 16.
Figure 17B:
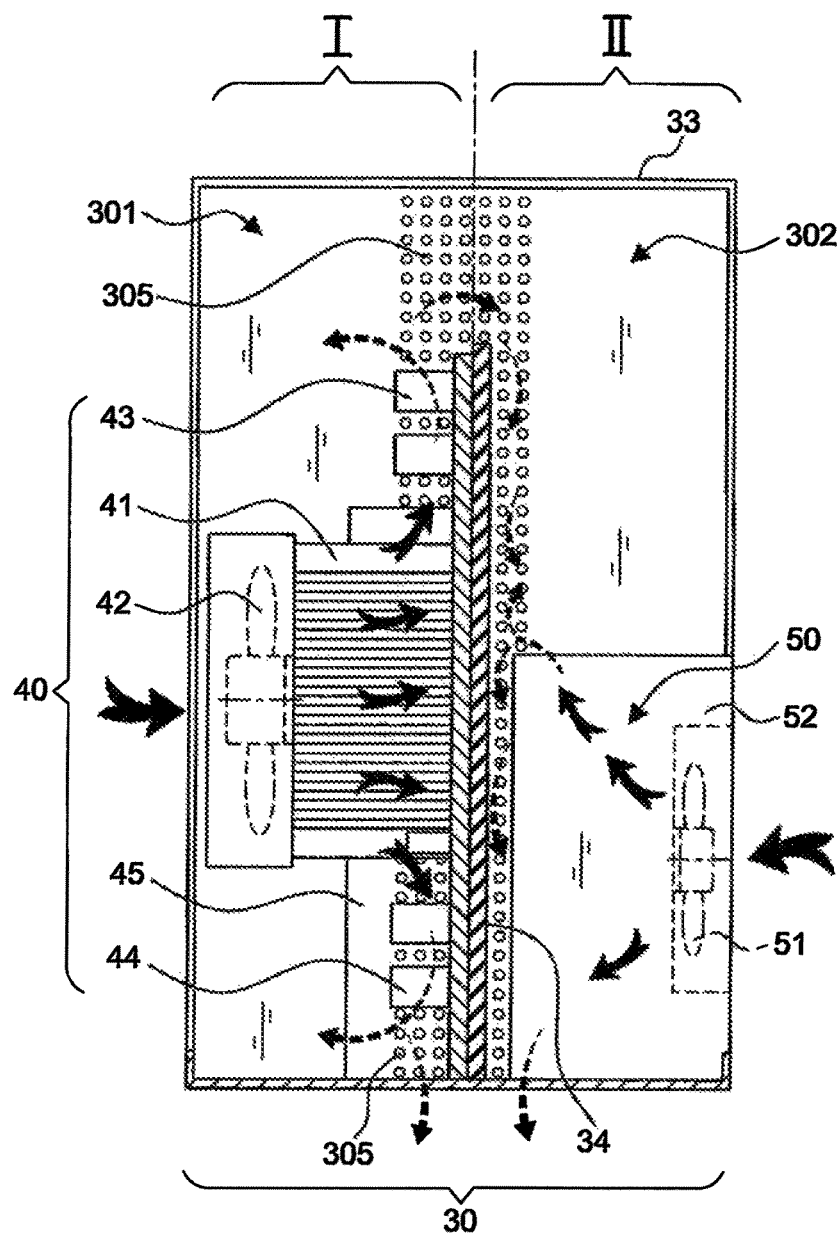
FIG. 17B is a cross-sectional view of FIG. 16 without the second electric connection port as depicted in FIG. 17A.

A power supply device 50 bundled with a housing 52 and a fan 51 is installed under the second assembling chamber 302 aligned parallel and adjacent to the backside of the motherboard 40 as shown in FIGS. 17A and 17B, wherein FIG. 17A shows that a movable support frame module 70A is installed at the top of the power supply device 50. Regardless of the existence of the movable support frame module 70A, the front side with the fan 51 of the power supply device 50 is aligned towards the outside and precisely corresponsive with the fan 42 of the heat sink 41 of the motherboard 40, and installed in parallel to the motherboard 40 and proximate to a lateral side of the tower chassis 30. By the separation of the housing 52 with the motherboard 40 and other electronic components, and the design of the ventilation hole 305, the power supply device 50 or together with the movable support frame module 70A form a independent wind field to suck external air into the tower chassis 30 for an air convection and exchange in a heat dissipation operation.

Figure 20:
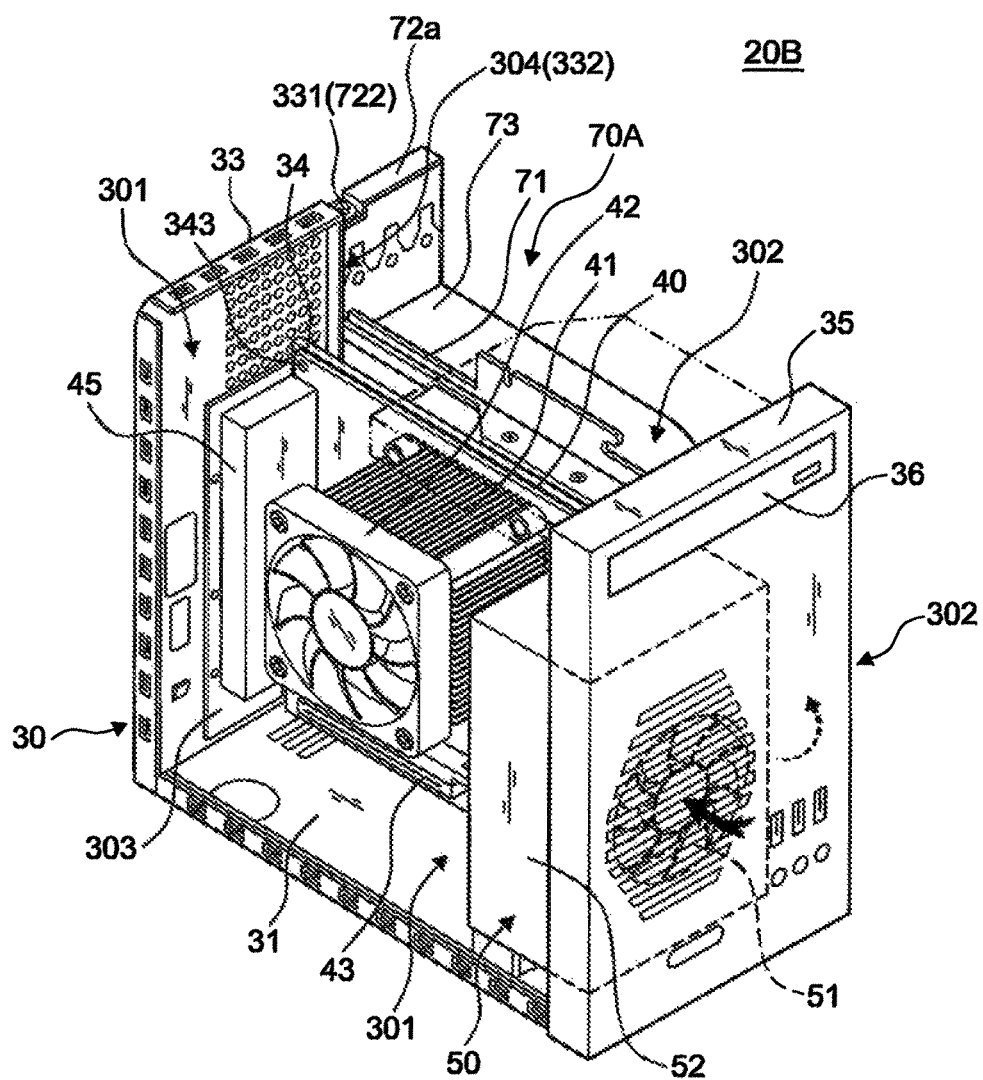
FIG. 20 is a perspective view of a second application of the present invention.

With reference to FIG. 20 for another preferred embodiment of the present invention, a power supply device 50 bundled with a housing 52 and a fan 51 is installed at a position in a direction opposite to the motherboard 40 and proximate to the front edge of the tower chassis 30. More specifically, the power supply device 50 is installed at a front end of the first assembling chamber 301 and second assembling chamber 302, such that the power supply device 50 becomes an independent wind field by using the partition of the housing 52 for sucking external air into the tower chassis 30 to perform air convection and exchange for a heat dissipation operation.

The technical characteristics and effects of the present invention will become apparent from the detailed description taken with the accompanying drawings as follows.

With reference to FIGS. 15 to 17A for schematic views of the present invention applied to a BTX tower computer system 20A, its structure is the same as that described above, and the same numerals are used for representing the respective elements. In this preferred embodiment, the motherboard 40 includes a motherboard used for a Pico-BTX desktop computer. The output power of the power supply device 50 is up to 550 W, and one fan 51 is installed on one lateral side of the tower computer system at least.

The front rack 32 of the tower chassis 30 includes a front panel 35, and a first electronic component 36 such as a 3.5-inch optical disk drive, a hard disk or a front-panel output slot embedded into the front panel 35.

Further, the first assembling chamber 301 contains a second electronic component 60 such as a display card with a fan 61 as well as an external casing and a hard disk.

Further, the movable support frame module 70A installed in the second assembling chamber 302 and an expanded electronic component 73 and installed on the support frame 71 such as an expansion card, a graphic card or any other devices attached with the fan are described in the foregoing preferred embodiments, and thus will not be described here again. The movable support frame module is installed next to a lateral side of the tower chassis, and with the housing for separating from the motherboard and other electronic components, the power supply device forms a wind field to suck external air directly into the tower chassis for the air convection and exchange in a heat dissipation operation.

Figure 1A:
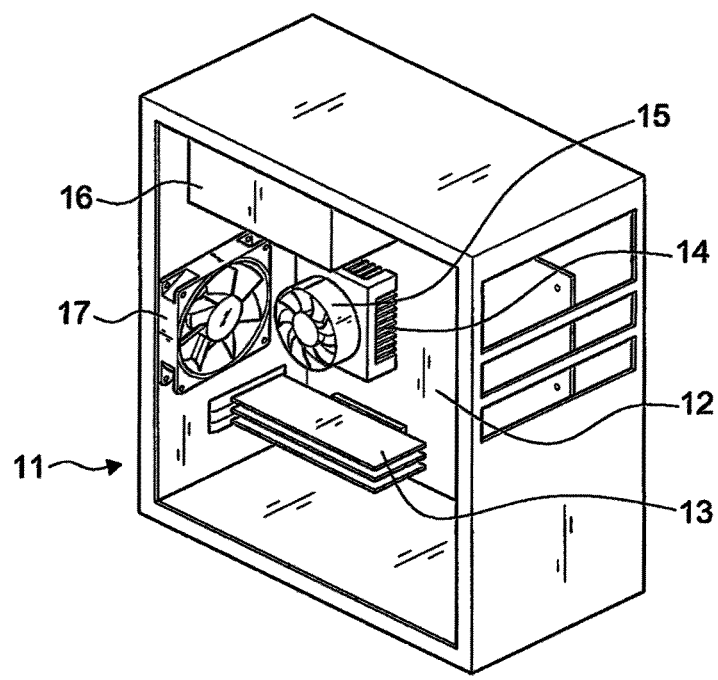
FIG. 1A is a perspective view of a conventional desktop computer.
Figure 1B:
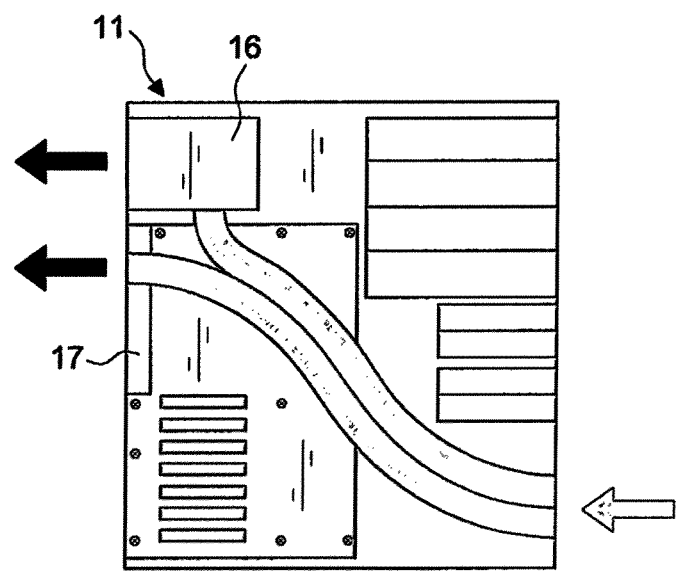
FIG. 1B is a schematic view of the wind field of the structure in FIG. 1A.
Figure 2:
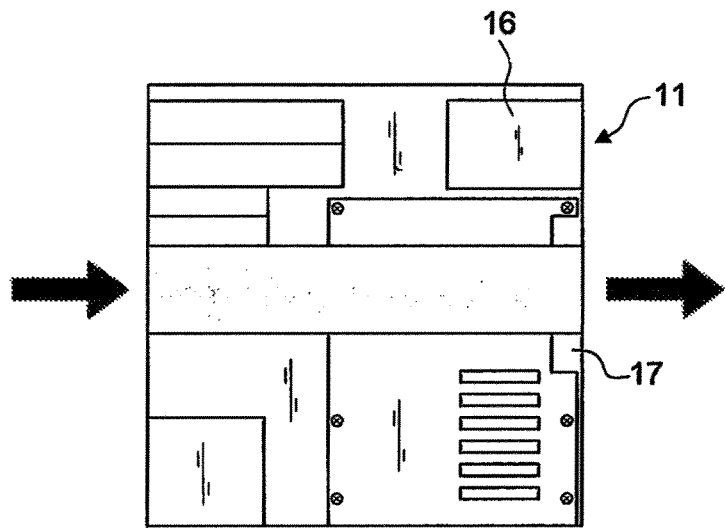
FIG. 2 is a schematic view of a conventional Intel BTX computer.
Figure 3:
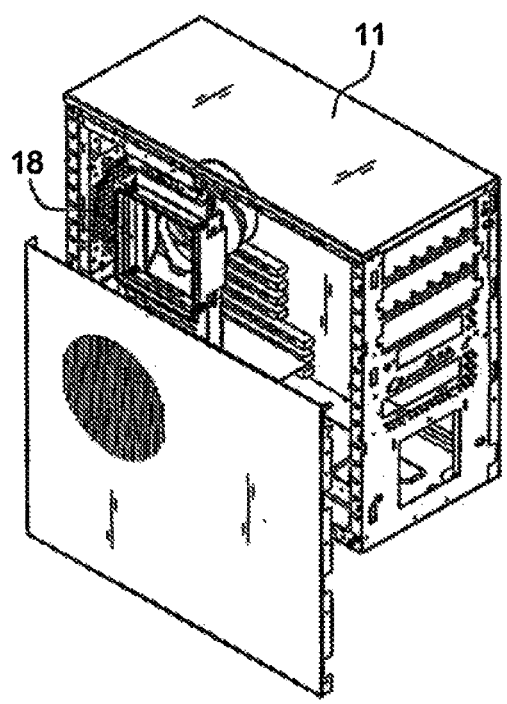
FIG. 3 is a perspective view of a computer according to Taiwan Pat. No. M255449.
Figure 4:
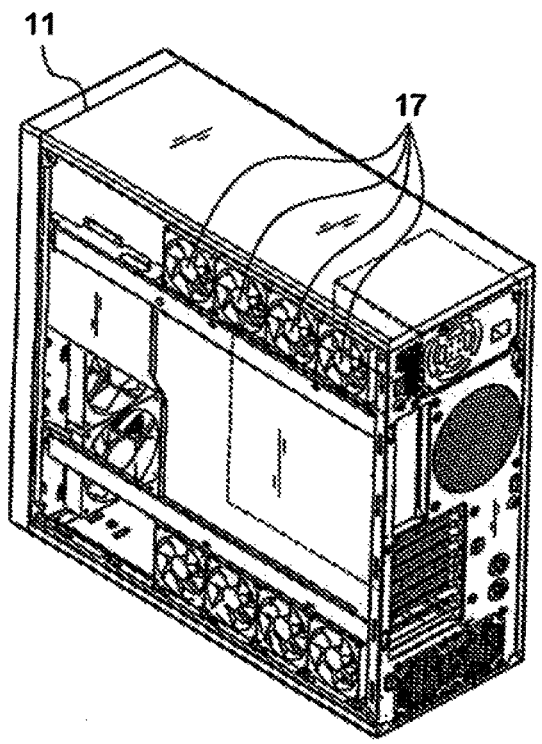
FIG. 4 is a perspective view of a computer according to Taiwan Pat. No. M343188.
Figure 5:
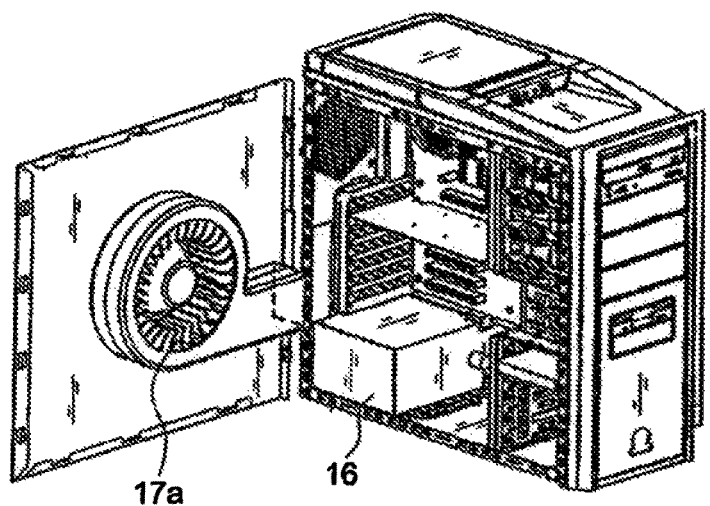
FIG. 5 is a perspective view of a computer according to Taiwan Pat. No. M363771.
Figure 6:
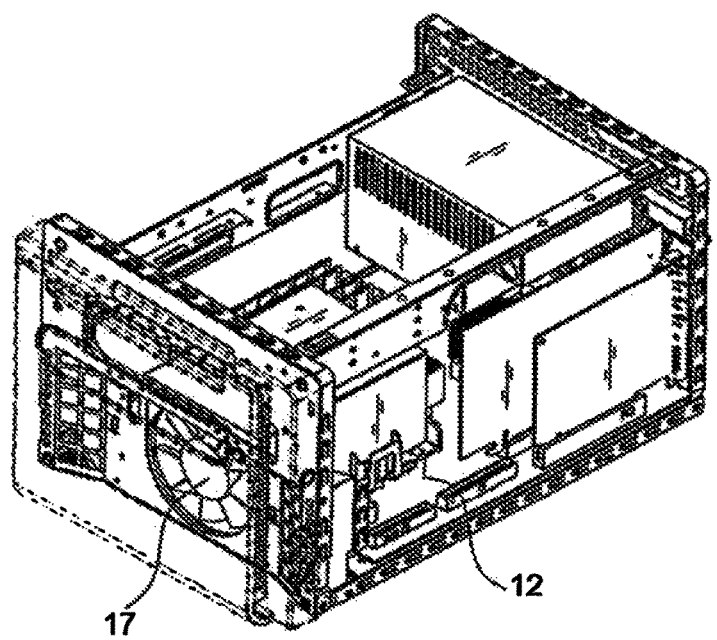
FIG. 6 is a perspective view of a computer according to Taiwan Pat. No. M261746.
Figure 7:
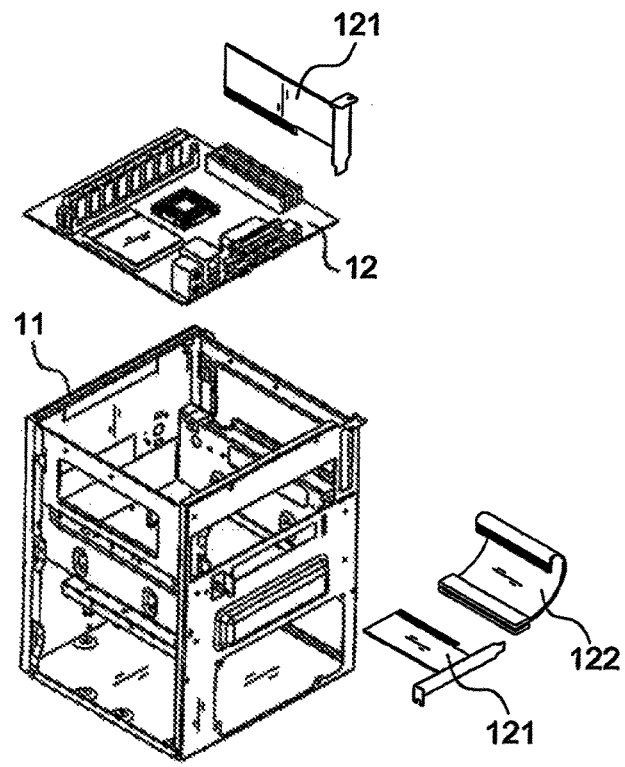
FIG. 7 is a perspective view of a computer according to Taiwan Pat. No. M361201.
Figure 8:
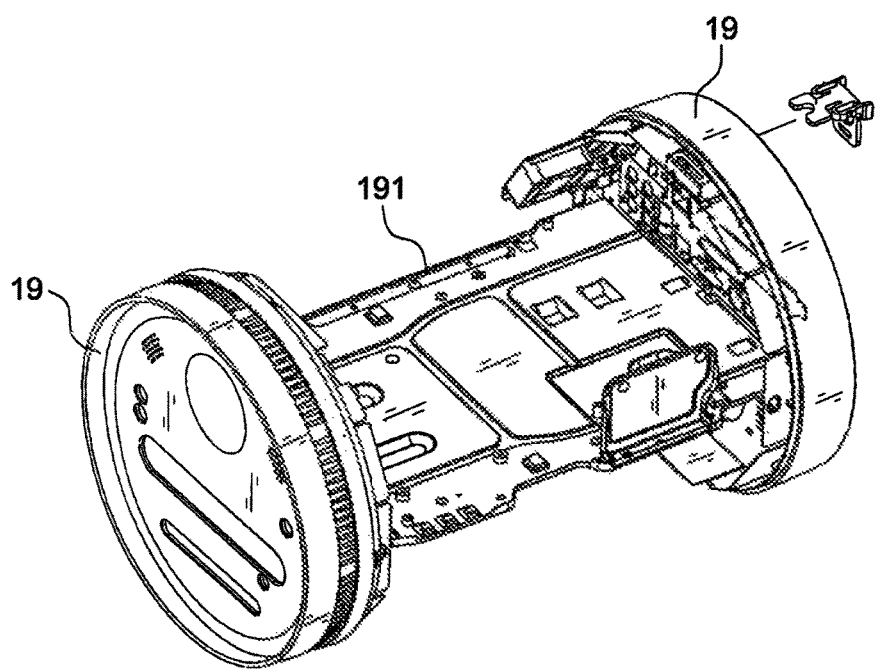
FIG. 8 is a perspective view of a computer according to Taiwan Pat. No. I274980.

Compared the foregoing preferred embodiments with the Taiwan Pat. No. M261746 in FIG. 6, in accordance with the present invention, the motherboard 40 and each component can be assembled in advance and then be installed in the first assembling chamber 301 or can be sequentially installed directly in the first assembling chamber 301 of the tower chassis 30, and the power supply device 50 is installed in the second assembling chamber 302, and the movable support frame module 70A and the front panel 35 are mounted, and other components such as the casing 37 is installed to complete the assembly. Therefore, the present invention overcome the shortcomings of the prior art and achieve the effects of a good heat dissipation, a quick assembling or replacement, and a flexible expansion capacity. In addition, the present invention provides a better flexibility of its use, and more diversified system functions.

Figure 18:
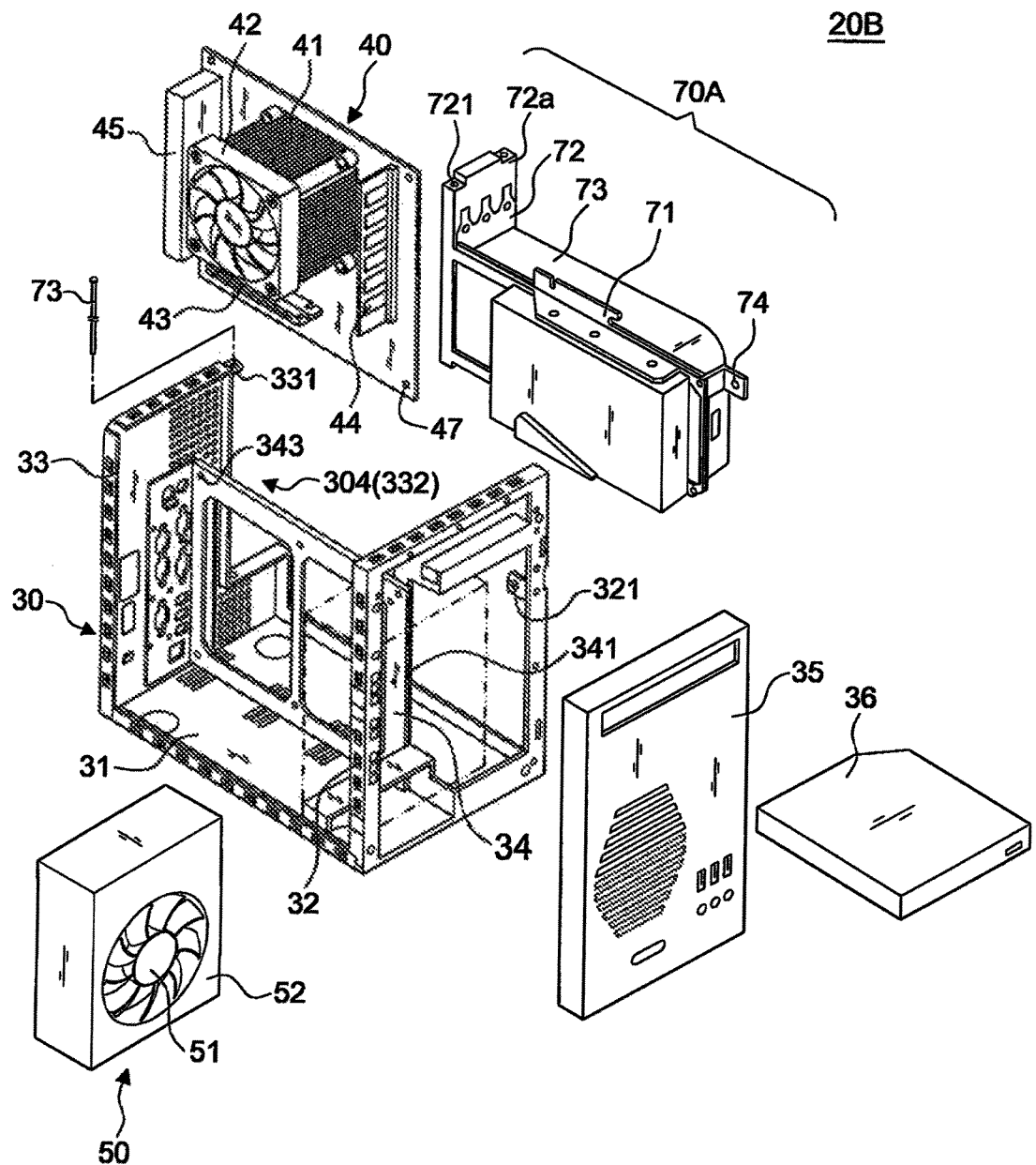
FIG. 18 is an exploded view of a second application of the present invention.
Figure 19:
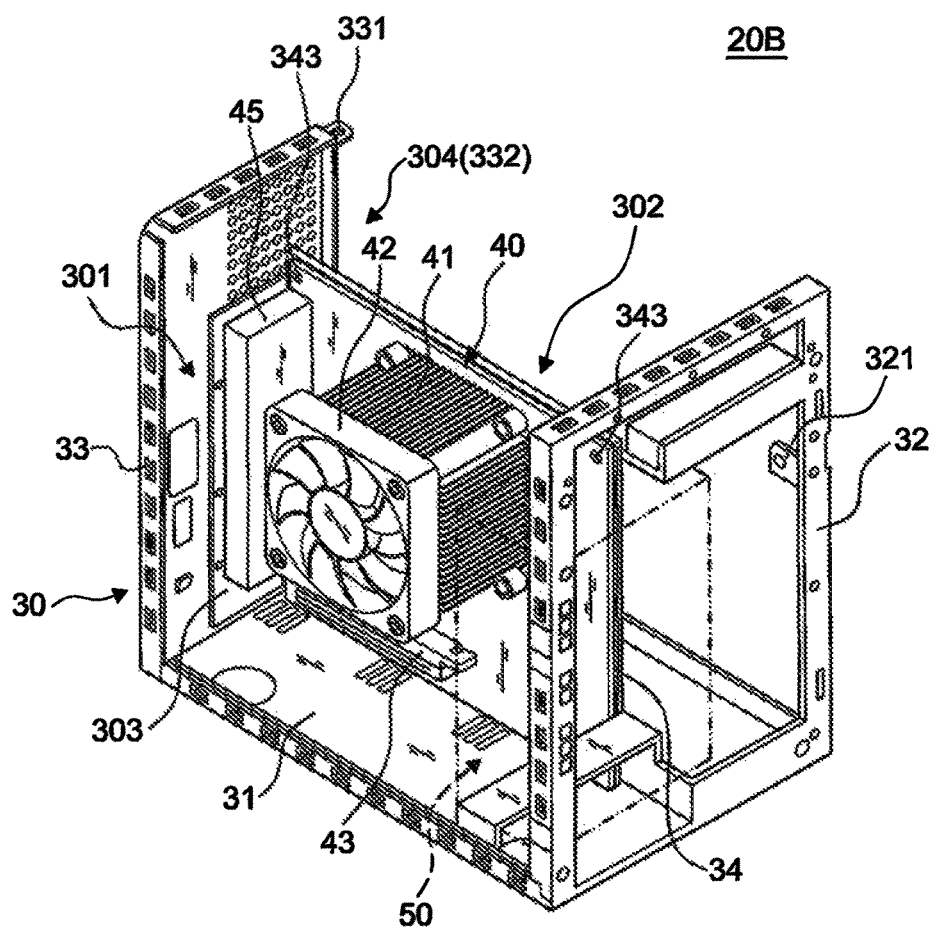
FIG. 19 is a perspective view of a chassis of a second application of the present invention.

With reference to FIGS. 18 to 20 for schematic views of the present invention applied to a MINI-ITX desktop tower computer system 20B, the motherboard 40 includes an AOPEN MCP7VT-V motherboard, which is the same as those used in a small personal computer system, and the same numerals are used for representing respective elements, and the difference resides on that:

1. It is a compact system capable of installing the motherboard 40 onto the U-shaped tower chassis 30 directly.

2. To meet the development trend for the dimensions of the expansion devices, the power supply device 50 is installed in the back-to-back direction and at a position having an angle of 90° with respect to the front end of the motherboard 40. Although the position is changed, after air is sucked from the front end, the air flows to the wind field of the assembling chamber, and thus the overall structure and effect are the same as those described above.

Figure 21:
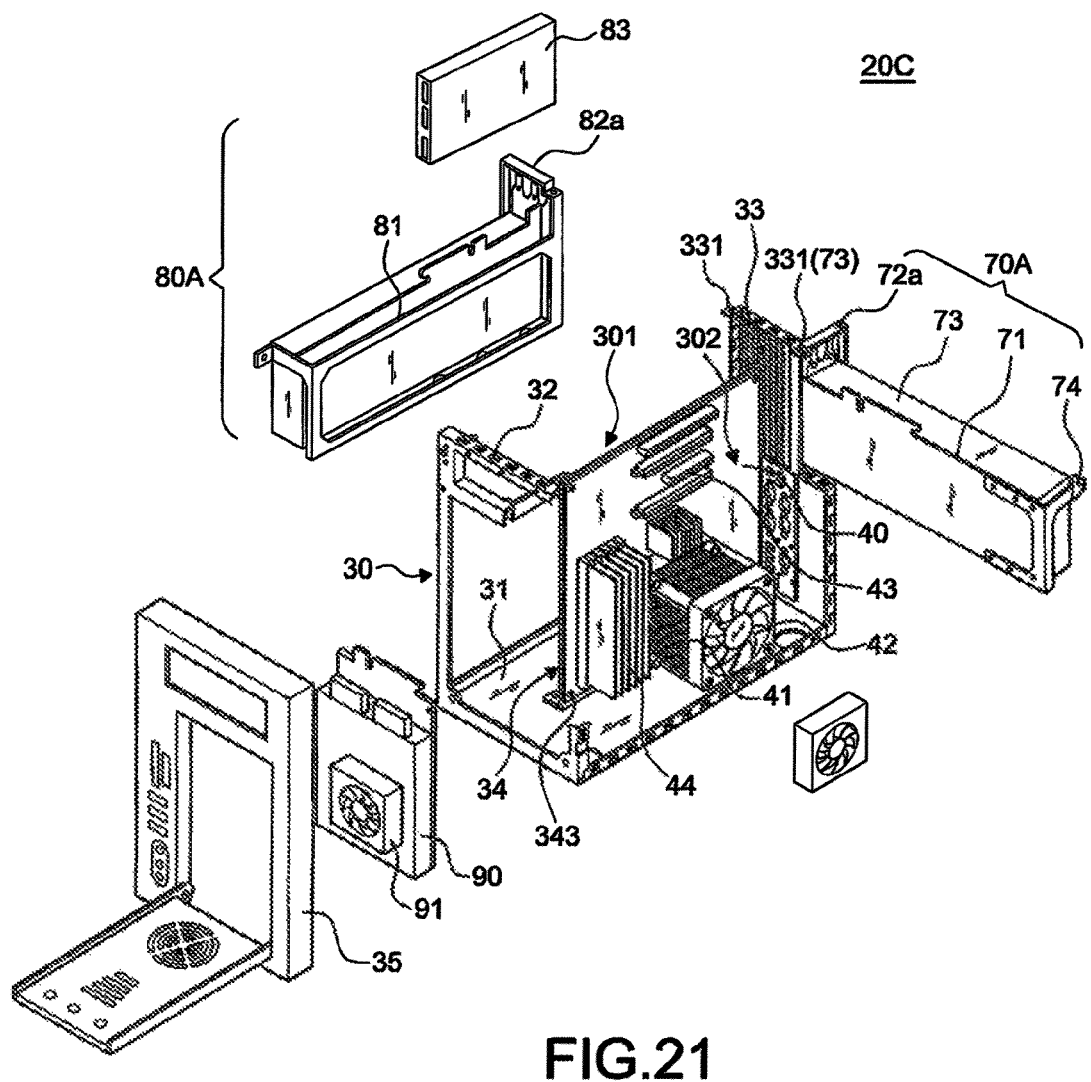
FIG. 21 is a perspective exploded view of a third application of the present invention.
Figure 22:
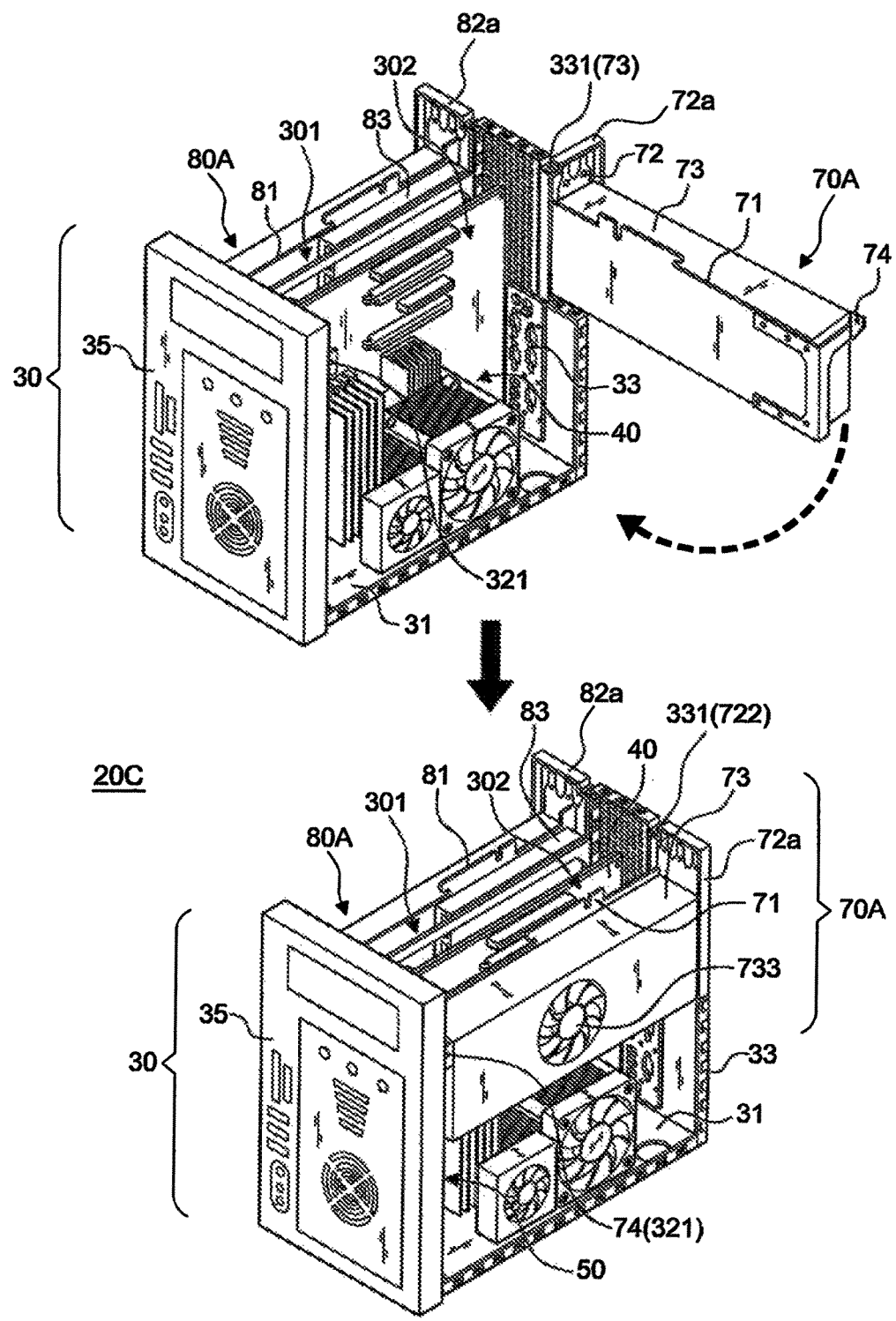
FIG. 22 is a perspective view of a third application of the present invention.

With reference to FIGS. 21 to 22 for schematic views of the present invention applied to a MINI-ATX tower computer system 20C, the motherboard 40 includes the ASUS MaximusIIJ GENE motherboard, and the difference from the aforementioned embodiments resides on that: a second assembling chamber 302 is disposed at the front side of the motherboard 40, and the front rack 32 includes a high-speed hard disk 90 equipped with a fan 91 to form an independent wind field. Further, the first assembling chamber 301 includes a movable support frame module 80A that can be opened laterally, and an expanded electronic component 73 installed on another movable support frame module 70A of the second assembling chamber 302, wherein the expanded electronic component 73 can be a hard disk or other expanded electronic components.

Figure 23:
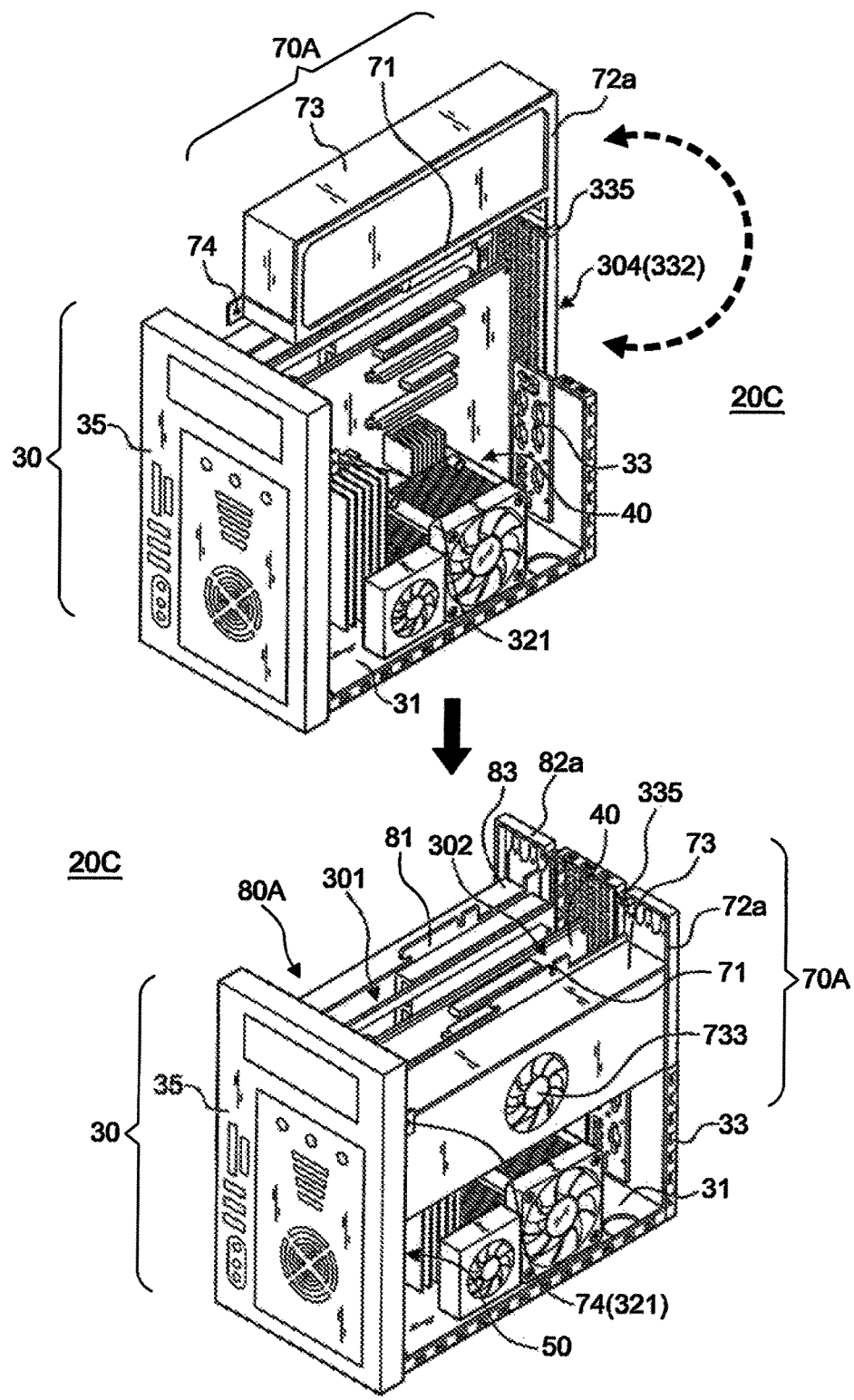
FIG. 23 is a perspective view of a fourth application of the present invention.

With reference to FIG. 23 for another preferred embodiment of the present invention applied to a MINI-ATX tower computer system 20C, the difference from the foregoing preferred embodiments resides on that a pivot base 335 is disposed axially on an internal upper side of the L-shaped slot 332, such that the engage/disengage element 72a of the movable support frame module can be lifted upwardly by using the pivot base 335 as an axis. When the movable support frame module is closed, a first flange plate 74 installed at the front side of the support module 70 is secured onto the first positioning plate 321 of the front rack.

Including a display card or a graphic card, the expanded electronic component can have a better heat dissipation effect with its fan 733 installed towards the external side sucking external air directly. Since the movable support frame module 70A or 80A of the present invention includes an I/O electric connecting port 72, 82 which is designed as an engage/disengage element 72a, 82a, such that when the rear rack 33 is lifted or open laterally, the expanded electronic component 73, 83 is electrically coupled to the I/O electric connecting port 72, 82, such that it can be operated smoothly in compliance with the characteristics and effects of the divided assembling chambers and wind fields. For the motherboard 40 or an electronic component such as a display card or an expansion card, a fan of its heat sink can be installed proximate to the edge of the chassis, such that external cold air can be sucked into the chassis and blown at a heat source of the chip for dissipating heat as well.

In the foregoing preferred embodiments, the present invention provides a tower chassis 30 with a motherboard 40 erected from the middle section, and a support module 70 installed in parallel and adjacent to the motherboard for the order assembly of expanded electronic components to form the left and right assembling chambers 301, 302 and their independent wind fields, so that the invention can achieve the effects of improving the heat dissipation efficiency, reducing the size of the chassis for a convenient assembling or disassembling process, and facilitating an upgrade expansion and a change of the application nature of the system.

Many changes and modifications in the above-described embodiments of the invention can, of course, be carried out without departing from the scope thereof Accordingly, to promote the progress in science and the useful arts, the invention is disclosed and is intended to be limited only by the scope of the appended claims.

What is claimed is:

1. A tower computer system, comprising:
a tower chassis, being a U-shape body composed of a bottom, a front rack and a rear rack;
a mounting assembly, installed at a middle section of a widthwise surface (W) of the tower chassis, and coupled to internal sides of the front rack and rear rack to form a vertical (Z-Z) connecting board, for providing a longitudinally perpendicular (X-Z) fixing position to a predetermined board, and acting as a longitudinal corresponding line (X1) formed by connecting the front rack to the rear rack for the connecting board of the mounting assembly, such that the transverse (Y-Y) widthwise surface (W) of the tower chassis is separated into a first assembling chamber with an opening aligned towards the left side and a second assembling chamber with an opening aligned towards the right side; and
a first electric connection port, disposed in a vertical direction (Z-Z) on the rear rack and at a position proximate to the mounting assembly, and situated in an area inside the first assembling chamber.

2. The tower computer system as recited in claim 1, wherein the mounting assembly comprises a single connecting board fixed onto internal sides of the front and rear racks of the tower chassis directly.

3. The tower computer system as recited in claim 1, wherein the mounting assembly comprises a front connecting plate and a rear connecting plate protruding from internal sides of the front and rear racks of the tower chassis respectively, and a connecting board coupled between the front and rear connecting plates.

4. The tower computer system as recited in claim 1, wherein the bottom and rear rack of the tower chassis include plurality of ventilation holes formed at a middle section.

5. The tower computer system as recited in claim 4, wherein the vertical connecting board of the mounting assembly includes a fixing position for fixing a motherboard which is a component with the largest area in the system, and the motherboard includes a connecting port erected from the rear of the front side and opposite to the first electric connection port, such that the motherboard is installed in a longitudinally perpendicular (X-Z) direction in the first assembling chamber, and the motherboard includes a first heat sink with a fan installed at the front side of the motherboard.

6. The tower computer system as recited in claim 5, wherein the rear rack of the tower chassis includes a second electric connection port installed in a vertical direction (Z-Z) of the rear rack and at a position proximate to the mounting assembly, disposed in an area inside the second assembling chamber, and arranged in the vertical direction (Z-Z) parallel and adjacent to the first electric connection port.

7. The tower computer system as recited in claim 6, wherein the second electric connection port includes a support module coupled with the second electric connection port, and the support module includes a support frame for supporting an expanded electronic component, and the support frame includes an I/O electric connecting port disposed on the rear side of the support frame and opposite to the second electric connection port and coupled to the second electric connection port, such that the support module is disposed in the second assembling chamber and arranged parallelly back to back with the motherboard and adjacent to each other, and the expanded electronic component includes a circuit board and a second heat sink with a fan installed on the front side of the circuit board, such that the second heat sink is back to back with the first heat sink on the front side of motherboard, and both first and second heat sinks are proximate to the lateral sides of the tower chassis, so that the fans of the first and second heat sinks suck external air from both sides and blows the air at the first and second heat sinks.

8. The tower computer system as recited in claim 7, wherein the support module includes a movable support frame module that can be opened and closed, and a rear side of the movable support frame module is provided for installing an engage/disengage element of the I/O electric connecting port, and coupled to the engage/disengage element for installing a support frame of the expanded electronic component, and the second electric connection port is a L-shaped or n-shaped slot matched with the shape of the movable support frame module, and either one side or both sides of the rear rack are provided for installing one or two movable support frame modules, such that when the slot is closed, the movable support frame module is situated between the front and rear racks and provided for installing the expanded electronic component on the movable support frame module.

9. The tower computer system as recited in claim 8, wherein the slot of the rear rack includes a rear pivot base, and the engage/disengage element of the movable support frame module includes a rear pivot hole formed thereon, so that a first pivot can be pivotally installed onto the rear pivot base, and the movable support frame module can be lifted open from the front to the back by using the rear pivot base as an axis, and when the movable support frame module is closed, a first flange plate installed on a front side of the support frame is secured to the first positioning plate installed at a position opposite to the front rack.

10. The tower computer system as recited in claim 8, wherein the front rack of the tower chassis includes a front pivot base, and the movable support frame module includes a front pivot hole formed at a front end of the support frame, and a second pivot is pivotally installed onto the front pivot base, such that the movable support frame module can be lifted opened from the slot to the front side by using the front pivot base as an axis, and when the movable support frame module is closed, the engage/disengage element of the movable support frame module is installed into the slot, and a second flange plate installed on the engage/disengage element is provided for securing second positioning plate installed at a position opposite to the rear rack.

11. The tower computer system as recited in claim 8, wherein the slot of the rear rack is an L-shaped slot, and the L-shaped slot includes a pivot base axially disposed on an internal upper side of the L-shaped slot, such that the engage/disengage element of the movable support frame module can be lifted from the bottom to the top by using the pivot base as an axis, and when the movable support frame module is closed, the engage/disengage element of the movable support frame module is installed into the slot, and a first flange plate installed on the front of the support frame is provided for securing first positioning plate installed at a position opposite to the front rack.

12. The tower computer system as recited in claim 5, wherein the second assembling chamber on the backside of the motherboard includes a power supply device equipped with a housing and a fan, and the power supply device is installed parallel and adjacent to the motherboard and proximate to a lateral side of the tower chassis, such that by the separation of the housing with the motherboard and other electronic components, the power supply device constitutes an independent wind field for sucking external air into the tower chassis to perform air convection and exchange in a heat dissipation operation.

13. The tower computer system as recited in claim 5, further comprising a power supply device equipped with a housing and a fan and installed in a back-to-back direction of the motherboard and at a position at the front edge of the tower chassis, and the power supply device is installed at a front end of the first assembling chamber and second assembling chamber, such that the power supply device can be divided by the housing into an independent wind field, and external air is sucked into the tower chassis directly for performing air convection and exchange in a heat dissipation operation.

14. The tower computer system as recited in claim 5, wherein the front rack of the tower chassis includes a front panel and a first electronic component embedded into the front panel, and the first assembling chamber contains a second electronic component.

15. The tower computer system as recited in claim 5, wherein the U-shaped body of the tower chassis further includes a connecting element installed thereon to form a frame structure.

* * * * *